(12) United States Patent
Lally et al.

(10) Patent No.: US 10,295,380 B2
(45) Date of Patent: May 21, 2019

(54) METHOD AND APPARATUS FOR MULTIPLE LOCALIZED INTERFEROMETRIC MEASUREMENTS

(71) Applicant: LUNA INNOVATIONS INCORPORATED, Roanoke, VA (US)

(72) Inventors: Evan M. Lally, Blacksburg, VA (US); Justin W. Klein, Lansing, MI (US); Emily E. H. Templeton, Blacksburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 158 days.

(21) Appl. No.: 15/505,726

(22) PCT Filed: Aug. 21, 2015

(86) PCT No.: PCT/US2015/046287
§ 371 (c)(1),
(2) Date: Feb. 22, 2017

(87) PCT Pub. No.: WO2016/029110
PCT Pub. Date: Feb. 25, 2016

(65) Prior Publication Data
US 2017/0276523 A1    Sep. 28, 2017

Related U.S. Application Data

(60) Provisional application No. 62/040,561, filed on Aug. 22, 2014.

(51) Int. Cl.
*G01L 1/24* (2006.01)
*G01D 5/353* (2006.01)
*G01M 11/00* (2006.01)

(52) U.S. Cl.
CPC ......... *G01D 5/353* (2013.01); *G01D 5/35361* (2013.01); *G01L 1/242* (2013.01); *G01M 11/00* (2013.01)

(58) Field of Classification Search
CPC ............... G01D 5/353; G01D 5/35306; G01D 5/35335; G01D 5/35361; G01L 1/242; G01M 11/00
See application file for complete search history.

(56) References Cited

U.S. PATENT DOCUMENTS 7,330,245 B2    2/2008    Froggatt
7,515,276 B2    4/2009    Froggatt et al.
(Continued)

FOREIGN PATENT DOCUMENTS

WO    WO 2013/085833    6/2013

OTHER PUBLICATIONS

International Search Report for PCT/US2015/046287, dated Nov. 30, 2015, 3 pages.
(Continued)

*Primary Examiner* — Michael A Lyons
(74) *Attorney, Agent, or Firm* — Nixon & Vanderhye P.C.

(57) ABSTRACT

An optical sensing fiber includes multiple reference reflectors spaced along a length of the fiber. Each of the multiple reference reflectors producing a reference scattering event having a known scattering profile including an elevated amplitude relative to scattering detected for neighboring segments of the optical fiber. Each of the segments is a length of contiguous fiber that is useable to initialize and perform a distributed Optical Frequency Domain Reflectometry (OFDR) sensing operation. An OFDR interrogation system is disclosed that measures a parameter using the optical sensing fiber.

33 Claims, 18 Drawing Sheets

(56) References Cited

U.S. PATENT DOCUMENTS

| | | | |
|---|---|---|---|
| 7,772,541 B2 * | 8/2010 | Froggatt | G01M 11/083 |
| | | | 250/226 |
| 7,948,633 B2 | 5/2011 | Froggatt et al. | |
| 8,773,650 B2 | 7/2014 | Froggatt et al. | |
| 2009/0103100 A1 | 4/2009 | Froggatt et al. | |
| 2010/0145648 A1 | 6/2010 | Moore et al. | |
| 2014/0112615 A1 * | 4/2014 | Kreger | G01B 11/16 |
| | | | 385/13 |
| 2014/0336973 A1 * | 11/2014 | Froggatt | G01B 9/02004 |
| | | | 702/104 |
| 2015/0377692 A1 * | 12/2015 | Cooper | G01M 11/3172 |
| | | | 356/73.1 |
| 2016/0245643 A1 * | 8/2016 | Mori | G01K 11/3206 |

OTHER PUBLICATIONS

Written Opinion of the ISA for PCT/US2015/046287, dated Nov. 30, 2015, 9 pages.

International Preliminary Report on Patentability for PCT/US/2015/046287 dated Dec. 13, 2016, 27 pages.

M. Froggatt et al, "Distributed measurement of static strain in an optical fiber with multiple Bragg gratings at nominally equal wavelength" *Applied Optics*, vol. 37, No. 10, Apr. 1, 1998, pp. 1741-1746.

M. Froggatt et al, "Correlation and Keying of Rayleigh Scatter for Loss and Temperature Sensing in Parallel Optical Networks" *Optical Fiber Communications*, Feb. 23-27, 2004, 3 pages.

D.K. Gifford et al, "High precision, high sensitivity distributed displacement and temperature measurements using OFDR-based phase tracking" *Proc. SPIE*, vol. 7753, May 17, 2011, 4 pages.

* cited by examiner

Noisy phase comparison (measurement vs. reference) due to vibration

Improved phase comparison (corrected measurement vs. reference)

METHOD AND APPARATUS FOR MULTIPLE LOCALIZED INTERFEROMETRIC MEASUREMENTS

PRIORITY APPLICATION

This application is the U.S. national phase of International Application No. PCT/US2015/046287, filed Aug. 21, 2015, which designated the U.S. and claims the benefit of U.S. provisional patent application 62/040,561, filed on Aug. 22, 2014, the entire contents of each of which are hereby incorporated herein by reference.

This invention was made with U.S. Government support under Contract No. 2014-14071000012 awarded by IARPA. The government has certain rights in the invention.

TECHNICAL FIELD

The technology relates to interferometric sensing applications. One example application is to Optical Frequency Domain Reflectometry (OFDR) sensing.

BACKGROUND AND SUMMARY

Optical Frequency Domain Reflectometry (OFDR) is an effective system for measuring strain in optical fiber with high spatial resolution. See, e.g., U.S. Pat. Nos. 6,545,760; 6,566,648; 5,798,521; and 7,538,883. This high resolution measurement is useful in various industries by providing a near continuous measurement of strain along the fiber's length, e.g., see U.S. Pat. No. 8,714,026. Further, the high resolution strain measurement enables additional technologies such as optical fiber based shape and position sensing, e.g., see U.S. Pat. Nos. 7,772,541; 7,781,724; and 8,773,650.

In an OFDR measurement, a tunable laser is swept linearly in time across a range of frequencies. This sweep takes a fixed amount of time to perform. If the laser's sweep is linear in optical frequency vs. time, the sensing fiber remains stationary during the sweep duration, and the sensing fiber polarization mode dispersion or chromatic dispersion is negligible, each scattering location in the sensor produces a nearly pure sinusoidal interference signal. The frequency of this signal is proportional to the time-of-flight delay it takes for laser light to reach and return from the specific scattering location. Multiple scattering locations along the length of the fiber each add their own interference signals at their respective interference frequencies. In this way, OFDR produces a map of the sensing fiber in which interference frequency corresponds to time-of-flight delay between the OFDR instrument and each position along the length of the fiber.

OFDR measurements are susceptible to degradation of measurement coherence when the above assumptions are violated. In order for a single scattering location to produce a pure interference frequency, the fiber under test must remain static during the course of the laser's scan and interference data acquisition. Any disturbance that results in a change of total time-of-flight delay at the sensing location degrades the OFDR measurement. Such changes can be due to movement or rapid changes in the temperature or strain state of the fiber under test or of the fiber optic leads that connect the fiber under test to the instrument. Degradation of the coherence of the scatter pattern at a sensing element can lower the signal to noise ratio of the strain measurement for that sensing element.

Motion-induced degradation is a result of a scattering location's otherwise constant time-of-flight delay changing during the course of the laser sweep. Motion is typically represented by dynamic strain, the effects of which are cumulative (a detailed treatment is presented in U.S. Patent Application 20140336973). Any change in delay at a point in the sensor is the result of the accumulation of tension or compression along the entire length of fiber between the OFDR laser source and the sensing location. Therefore, if dynamic strain (induced by motion) is allowed to accumulate constructively over a long fiber length, the resulting degradation at the end of the fiber worsens with sensing fiber length. This dynamic strain scenario is encountered in many applications, such as a strain sensing fiber bonded to a vibrating beam.

Sophisticated processing techniques have been developed to mitigate or remove the effects of variations that occur during an OFDR measurement as described in U.S. Patent Application 20140336973. These techniques account for the cumulative effect of dynamic strain as measured at a selected point in the fiber. In this technique, a baseline measurement is collected a-priori, during which the fiber is held stationary; it is not exposed to any time-varying disturbance. In subsequent measurements, a computer-implemented algorithm compares a short region of perturbed measurement data to the corresponding region in the baseline reference. Subsequent data processing allows one to extract a measurement of the time-varying disturbance in the time-of-flight delay to that point along the length of the sensing fiber. This measurement is then used to form a correction for the OFDR measurement data. This technique greatly increases the range of OFDR applications allowing strain measurements to be performed in practical sensing environments in which ideal, static environments are not feasible.

Due to their reliance on pristine baseline data, these existing techniques are computationally expensive and may be difficult to apply efficiently in several practical applications. First, the comparison between perturbed measurement data and pristine baseline data must be performed over a finite length of optical fiber, e.g., on the order of 2 cm, that encompasses multiple scattering locations. If there is an optical frequency shift between the measurement and baseline states that is not constant along the comparison length, due to strain gradients and other time-constant phenomena that vary spatially along the length of the fiber, the measurement of the time variant time-of-flight delay will be in error, and the correction will not be effective. This finite-length requirement makes it difficult to employ existing techniques along the length of a sensor which exists in an unknown state.

Second, the known technique requires that the measurement and baseline data be properly aligned in time-of-flight delay before a comparative vibration measurement can be made; the chosen measurement region must be compared against the corresponding region in the reference data to determine and correct for any changes in optical delay to the sensor region used for vibration correction. In order to perform this alignment, the sensing algorithm must determine the cumulative state of the fiber at the sensing location. For long sensors, or in applications which require multiple vibration correction points, this becomes computationally expensive. Note that this task is made more difficult by the presence of vibration, which obscures attempts to find a valid starting point for the calculation. With large data sets obtained for longer sensing lengths, it may not be feasible to analyze the signals to determine the state of the fiber leading up to a location in the sensing fiber.

Third, because the existing technique is comparative (measurement data to baseline data), the perturbed measurement must not be changed so significantly that it no longer matches the pristine baseline well enough to deduce small changes in optical phase over the duration of the laser scan. This limits this technique's application under high levels of accumulated dynamic strain.

The inventors realized a need for technology that produces localized measurements of dynamic perturbations along the length of a sensing fiber with minimal or no reliance on a-priori baseline data and minimal or no need for information describing the state of the fiber leading up to that location of the fiber. A specialized sensing fiber is manufactured with discrete reflectors inscribed at known locations along the sensing optical fiber. Conventional wisdom in this field considers such a sensing system, including the specialized sensing fiber, as impractical. However, the inventors discovered that that such a sensing system could be made practically and greatly simplifies the process of measurement and subsequent correction of vibration, enabling more efficient application in a wide variety of situations, including those which present a processing challenge to the existing approach.

The discrete reference reflectors along the specialized sensing fiber allow initialization of the parameters associated with strain processing of OFDR data and measurement and correction for the effects of time-varying perturbations at or near a location of these discrete reference reflectors along the sensing fiber. Because the reference reflectors are inscribed specifically for this purpose, they are made to exhibit ideal or other known and distinguishing characteristics and therefore produce a high-fidelity measurement of dynamic strain with little computational load under large-amplitude motion, in the presence of spatial strain gradients, and/or over long measurement lengths. Hence, these discrete reference reflectors enable practical implementation of OFDR measurement techniques in the presence of time-varying disturbances in sensing fiber of unknown state, even in the case where these time-varying perturbations are allowed to accumulate over long lengths.

Further, a sensor manufactured with such discrete reference reflectors may be considered as a multi-point vibration sensor in which an independent vibration measurement is made at each reference reflector. Such a sensor also enables processing to allow the mitigation of other optical effects detrimental to OFDR measurements such as but not limited to polarization mode dispersion and chromatic dispersion. Additionally, the discrete reference reflectors are described to assist in identifying geometrical parameters of an optical sensing fiber such as but not limited to identification of physical distances along the length of the sensing fiber and cross sectional orientation of a multi-core optical fiber.

It is important to note that while the application of discrete localized reference reflectors is described for time-varying perturbations such as vibration, the technology described in this application applies to any phenomenon that undermines the fundamental OFDR assumption: that a single scattering location produces a pure frequency as a result of the OFDR swept-laser interferometry process. Because the laser's frequency must be swept linearly in time, this means that imperfect linearization, chromatic dispersion, and/or other optical frequency (spectral)-domain effects are registered locally and may be corrected for at or near each reference reflector, with minimal processing or a-priori knowledge required.

Example embodiments include an Optical Frequency Domain Reflectometry (OFDR) interrogation system and method for measuring a parameter of an optical sensing light guide that uses an optical interferometric interrogator. The optical sensing light guide is manufactured to have one or more localized reference reflectors. Each reference reflector produces a scattering event having a known scattering profile including elevated amplitude relative to scattering detected for neighboring segments of the optical sensing light guide. Each of the neighboring segments of the optical sensing light guide is a length of contiguous optical sensing light guide that is useable to initialize and perform a distributed OFDR sensing operation. Optical detection circuitry, coupled to the optical interferometric interrogator, detects optical interferometric measurement signals for a length of the optical sensing light guide. Data processing receives interferometric measurement signals from the optical detection circuitry and generates an interferometric measurement data set for the length of the optical sensing light guide. The interferometric measurement data set in proximity of each of the one or more reference reflectors is isolated, and an error signal is determined from the isolated data set for each of the reference reflectors. The error signal is provided for correction of the interferometric measurement data set and/or reported.

In some example embodiments, the segment is a contiguous length of sensing fiber ranging in length from several centimeters to tens or hundreds of meters and/or the segment does not include another reference reflector.

In some example embodiments, the known scattering profile is associated with an interference in a spectral domain of a discrete frequency proportional to a distance to a location of the scattering event along the length of the optical sensing light guide.

In some example embodiments, the reference reflector has a length that is on the order of a measurement resolution of the interferometric measurement data set.

In some example embodiments, the error signal is determined without requiring baseline OFDR measurement data for the optical sensing light guide.

In some example embodiments, the interferometric measurement data set is corrected locally for, at, or near each scattering event with little or no a-priori knowledge of the state of the optical sensing light guide up to that point in the fiber.

In some example embodiments, each scattering event has a spectral domain response of substantially constant magnitude and substantially increasing and substantially linear phase over a range of optical frequencies swept by a tunable laser source.

Each scattering event is distinguishable from Rayleigh scattering and/or scattering associated with fiber Bragg gratings (FBGs).

In some example embodiments, the error signal compensates the interferometric measurement data set for time-varying perturbations such as vibration effecting the optical sensing light guide and distorting the interferometric measurement data set of the parameter of the optical sensing light guide.

In some example embodiments, the error signal compensates the interferometric measurement data set for any phenomenon that undermines an assumption that a single scattering location produces a pure frequency as a result of an OFDR swept-laser interferometry process. The phenomenon may include non-linearity in time in an OFDR laser frequency sweep and/or, chromatic dispersion.

In some example embodiments, a region of the interferometric measurement data set is selected and isolated in a delay domain centered at a reference reflector. The isolated data is transformed to the spectral domain, and the phase argument is extracted from the spectral domain data to produce a measurement of the reflector's response. This is combined with the reflector's known response to produce a measured error signal.

In some example embodiments, an error signal is measured using a reference reflector. A portion of the interferometric measurement data set is selected and isolated in a delay domain to be compensated by a determined error signal. The isolated interferometric measurement set is transformed from the delay domain to a spectral domain, and the error signal is applied to the transformed isolated data. The compensated data is transformed to the delay domain to provide a compensated measurement data set for subsequent measurement of distributed sensor response.

In some example embodiments, an error signal is measured for each of multiple reference reflectors along the length of the optical fiber. The entire measurement data set in the delay domain is divided into a number of segments equal to the number of multiple reference reflectors. Each of the multiple measurement segments is compensated by an error signal from a reference reflector located in proximity to each of the portions of measurement data. A corrected interferometric measurement data set is produced by combining the data from each of the corrected measurement segments.

In some example embodiments, a error signal is measured using a reference reflector, and a derivative of the error signal is determined. A segment of the interferometric measurement data leading up to the location of the reference reflector is selected and an inverse Fourier transform performed. The spectral domain response of the interferometric measurement data portion is resampled to have an optical frequency increment proportional to the derivative of the error signal for each of the data points. A Fourier Transform performed on the resampled spectral domain response produces corrected interferometric measurement data that is corrected continuously over the interferometric measurement data portion.

Another aspect of the technology is an optical sensor including an optical fiber including multiple reference reflectors spaced along a length of the fiber. Each of the multiple reference reflectors producing a reference reflector having a known scattering profile including an elevated amplitude relative to scattering detected for neighboring segments of the optical fiber. Each of the segments is a length of contiguous fiber that is useable to initialize and perform a distributed Optical Frequency Domain Reflectometry (OFDR) sensing operation.

In some example embodiments, the optical sensor is a multi-point vibration sensor configured for vibration measurement and correction at each reference reflector.

In some example embodiments, the reference reflectors may be introduced in the optical fiber with a pulsed laser, included in a core of the optical fiber with minimal or no damage to the cladding and/or coating of the fiber, and/or spliced into the optical fiber.

DETAILED DESCRIPTION

Figure 1:
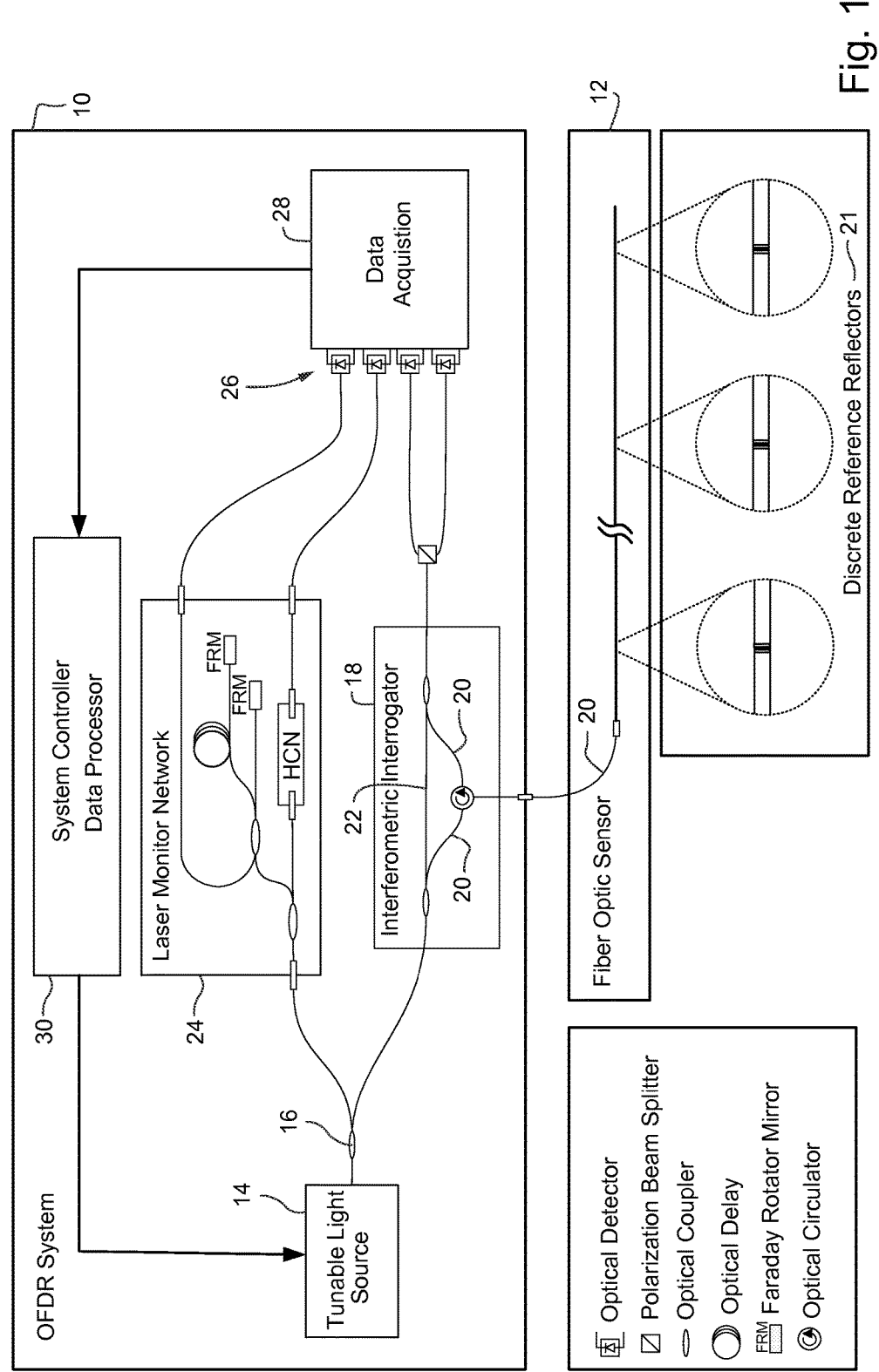
FIG. 1 is an example of an OFDR system used to interrogate a fiber optic sensor constructed with discrete reference reflectors.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks are shown in some figures. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated blocks may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The technology in this application provides an OFDR-based method and apparatus that compensates for errors experienced in practical fiber optic sensing applications. The fiber optic sensor in this application has been modified or manufactured to include discrete, localized events referred to as "reference reflectors." The term sensor as used in this application includes any waveguide to which OFDR-based measurement techniques may be applied that includes these discrete, localized reference events. A time-varying signal that distorts an OFDR measurement includes any form of motion of the sensor that occurs over a timescale comparable to that of the OFDR measurement. A vibration is one non-limiting example while a sudden movement is another. A vibration of constant frequency and amplitude has a distinct profile in an OFDR measurement while jarring of the sensor or sensor lead during an OFDR measurement has a less defined profile. In both cases, the motion can be detrimental to the accuracy of the intended measurement. The term "motion" is used to encompass any type of error source that varies the position of the sensing fiber during an OFDR measurement.

Optical Frequency-Domain Reflectometry (OFDR)

OFDR is highly effective at performing high resolution distributed measurements of a scattering profile along the length of a waveguide. Scattering of light along the waveguide is related to the local index of refraction at a given location. Two consecutive measurements can be compared to detect local changes of index of refraction along the length of the waveguide by detecting changes in the scattering profile.

FIG. 1 is a non-limiting example setup of an OFDR system 10 used to monitor local changes of index of refraction along the length of a fiber optic sensor 12 useful in one or more measurement and/or sensing applications. In some applications, the fiber optical sensor functions as a sensor, and in other applications, it may be a device under test (DUT) or other entity. A tunable laser source (TLS) 14 is swept through a range of optical frequencies. This light is split with the use of one or more optical couplers 16 and routed to two separate interferometers. The first interferometer serves as an interferometric interrogator 18 which is connected to the sensing fiber 12. Light enters the sensing fiber 12 through the measurement arm 20 of the interferometric interrogator 18. Scattered light along the length of the fiber is then interfered with light that has traveled along the reference arm 22 of the interferometric interrogator 18. The second interferometer within a laser monitor network 24 measures fluctuations in the tuning rate as the light source scans through a frequency range. The laser monitor network 24 also contains an absolute wavelength reference, such as a Hydrogen Cyanide (HCN), gas cell which is used to provide absolute optical frequency reference throughout the measurement scan. A series of optical detectors 26 converts detected light signals from the laser monitor network, HCN gas cell, and the interference pattern from the sensing fiber into electrical signals for a data acquisition circuitry 28. A system controller data processor 30 uses the acquired electrical signals from the data acquisition circuitry 28 to extract a scattering profile along the length of the sensor 12 as is explained in more detail in conjunction with FIG. 2.

Figure 2:
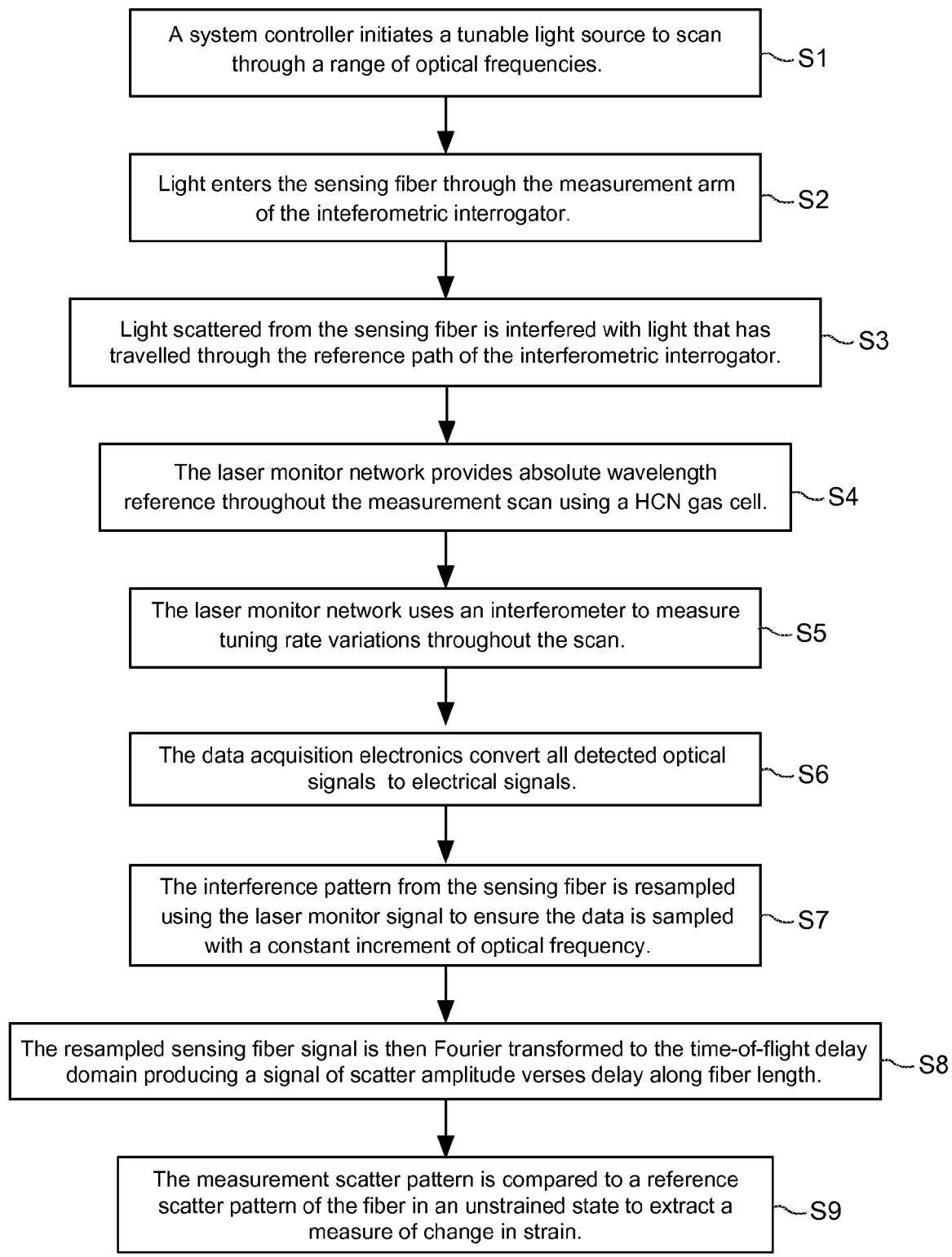
FIG. 2 is a flowchart illustrating example OFDR measurement and processing procedures.

FIG. 2 is a flowchart diagram of non-limiting, example distributed measurement procedures using an OFDR system. In step S1, the tunable light source is swept through a range of optical frequencies and directed into the sensor via the measurement arm of the interferometric interrogator (step S2). Scattered light along the length of the sensor interferes with light that has traveled through the reference path of the interferometric interrogator (step S3). An absolute wavelength reference is provided for the measurement scan (step S4), and tuning rate variations are measured (step S5). Optical detectors convert detected optical signals into electrical signals (step S6) for processing by the data processor.

The equation below gives a mathematical representation of the interference signal x(t) associated with a point reflector at time-of-flight delay $\tau_s$, relative to the reference arm of the interferometer, as received at the detector. A is the amplitude of the received interference signal. The frequency scan rate of the TLS is denoted by dv/dt, where v represents the laser's frequency and t represents time. The variable ϕ accounts for the initial phase offset between the two signal paths in the OFDR interferometer.

$$x(t) = A\cos\left[2\pi \frac{dv}{dt}\tau_s \cdot t + \phi\right] \quad (1)$$

The interference pattern of the sensing fiber is preferably resampled using the laser monitor signal to ensure the detected signals are sampled with a constant increment of optical frequency (step S7). Once resampled, a Fourier transform is performed to produce a sensor scatter signal in the time-of-flight delay domain. In the delay domain, the scatter signal depicts the amplitude of the scattering events as a function of delay along the length of the sensor (step S8). Using the distance light travels in a given increment of time, this delay is converted to a signal measure of length along the sensor. In other words, this signal depicts each scattering event as a function of distance along the sensor. The sampling period is referred to as the spatial resolution and is inversely proportional to the optical frequency range through which the tunable light source was swept during the measurement.

OFDR-Based Sensing

As the sensing fiber is strained, local scatters shift as the fiber changes in physical length. It can be shown that these shifts are highly repeatable. Hence, an OFDR measurement can be retained in memory that serves as a "baseline" reference of the unique pattern of the fiber in a characteristic state, e.g., static, unstrained, and/or at a reference temperature. A subsequent measurement can be compared to this baseline pattern to gain a measure of shift in delay of the local scatters along the length of the sensing fiber. This shift in delay manifests as a continuous, slowly varying optical phase signal when compared against the reference scatter pattern. The derivative of this optical phase signal is directly proportional to change in physical length of the sensing core. Change in physical length can be scaled to strain producing a continuous measurement of strain along the sensing fiber (step S9).

Definition of OFDR Domains

OFDR data described to be in the "time-of-flight delay domain" refers to data depicting scattering amplitude along the length of the sensing fiber. The detected interference from scattered light at a distance along the fiber is proportional to the delay, or time of flight, of the light relative to the reference path. Hence, data in the delay domain can be scaled to a measure of physical distance along the length of the fiber if the index of refraction of the fiber is known. OFDR data described in the "spectral domain" refers to the detected interference pattern at the optical detectors 26 of the OFDR system 10 as a function of tunable laser optical frequency v.

Because the laser is assumed to be swept linearly in frequency vs. time (or the data is corrected such that this is the case), the spectral domain is interchangeable with the domain of physical time t. This simple relationship is illustrated mathematically below, in which x represents the OFDR interference signal as described in Equation 1. Equation 2 describes the linear sweep of the tunable laser source, in which $v_0$ is the laser's frequency at the start of the sweep. Equation 3 shows the result of the variable substitution, in which the constant phase term $\tilde{\phi}$ has been modified to include the constant frequency offset.

$$v(t) = v_0 + \frac{dv}{dt}\cdot t \quad (2)$$

$$x(v) = A\cos[2\pi \cdot v(t) \cdot \tau_s + \tilde{\phi}] \quad (3)$$

The real-valued representation of the OFDR process is shown mathematically above. In practice, the OFDR data is converted to phasor representation for more efficient processing. As a result, the working OFDR data in both the delay and spectral domain is complex valued having both a mathematical real and imaginary component at each data point. The data in the delay and spectral domains are related by a Fourier relationship as described previously.

Time/Spectral-Domain Distortions

As detailed above, during an OFDR measurement the optical interference between a reference path 22 and a measurement path 20 is recorded as a laser is swept through a range of optical frequencies. The resulting interference pattern at the optical detectors 26 of the system contains information about both the amplitude and the phase of the light reflected from the sensing fiber. The phase and amplitude of the interference pattern is recorded as a function of time through the laser sweep. A basic assumption of the system is that the interferometer system under interrogation, which includes the sensing fiber, does not change during the sweep, and that the phase and amplitude response of the system as a function of optical frequency is encoded in time as the laser is swept. Therefore, if the laser's optical frequency is known as function of time, the phase and amplitude response of the system is known as a function of the laser's optical frequency. If the system is not stationary in time, then a distortion resulting from motion like vibration will manifest in the resulting time/spectral-domain OFDR data. Similarly, if a spectral-domain distortion is present, such as a mismatch in sensor vs. monitor interferometer group velocity dispersion (GVD), this distortion will also manifest in the time/spectral-domain OFDR data.

Discrete Reference Reflectors

Distortions as a result of motion can be detected at a point along the length of the sensor through the use of one or more discrete reflectors as now described.

If a region of interference pattern data in the delay domain is isolated (e.g., using a windowing function) and passed through a Fourier transform, the result is the spectral-domain response of light scattered by the selected length of fiber. A point reference reflector in the delay domain preferably produces an interference in the spectral domain of a single frequency proportional to the distance to the location of the reflective event along the length of the optical fiber. In phasor representation, the point reflector's spectral domain response has a substantially constant magnitude and a substantially linearly increasing phase over the range of optical frequencies swept by the OFDR laser source. This relationship is illustrated in FIGS. 4-7. Since the response of a discrete reference reflective event is known, any deviation from this known response is attributed to a disturbance in the measurement of OFDR data, e.g., motion of the sensor.

Figure 3:
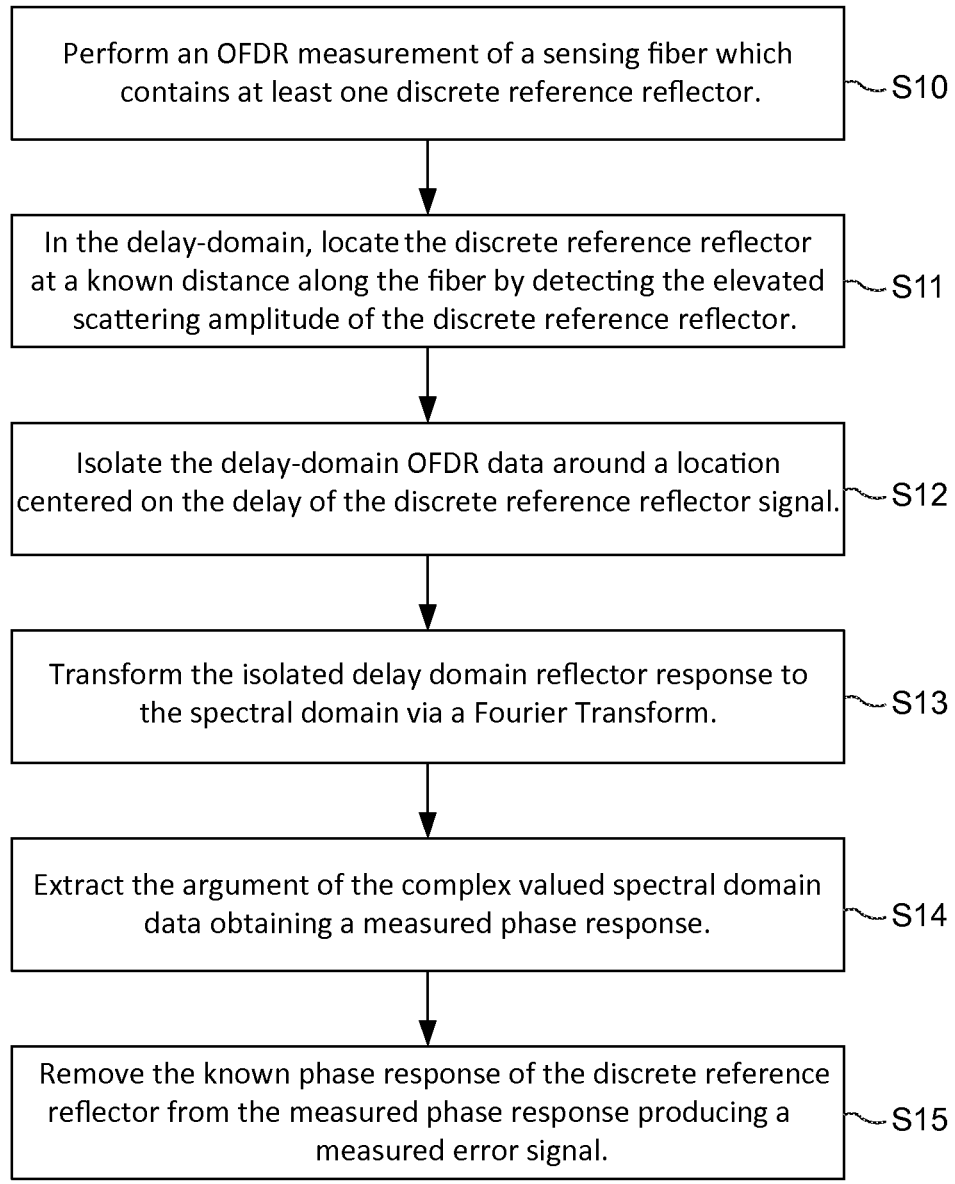
FIG. 3 is a flowchart diagram showing example procedures for extracting an error signal from a reference reflector.

FIG. 3 is a flow diagram of an example measurement of an error signal obtained by analyzing the response of a discrete reference reflector implemented by the data processor 30 shown in FIG. 1. The error signal may comprise a function in either the delay or spectral/time-domains which describes a perturbation or disturbance in the sensor. The error signal may also comprise a single compensating parameter or a set of compensating parameters which describe a known response or perturbation function in the delay or spectral/time-domains.

First, an OFDR measurement is performed (S10). The data in the delay domain is analyzed to locate the signal corresponding to the discrete reference reflector (S11). The reference reflector can be located, for example, based on knowledge of the manufactured position of the reference reflector along the length of the fiber or by analyzing the amplitude response to detect the elevated amplitude signal of the discrete reference reflector. A region of data in the delay domain is isolated around or in proximity with (e.g., centered at) the discrete reference reflector (S12). This isolation of the reference reflector's response can be performed by several example techniques such as applying a bandpass filter to the data, applying a windowing function to the data, or by isolating the segment of data at a trade-off of reduced resolution of the error signal. The data segment in the delay domain is transformed to the spectral domain via a mathematical Fourier Transform (S13). The data in the spectral domain is likewise complex-valued, and the phase argument of this complex valued data can be isolated mathematically to produce a measured spectral domain phase response (S14). The known phase response of the discrete reference reflector is subtracted from the measured phase response to obtain an error signal (S15). In an example embodiment, this is performed by subtracting a linear fit of the phase vs. laser frequency response.

Figure 4:
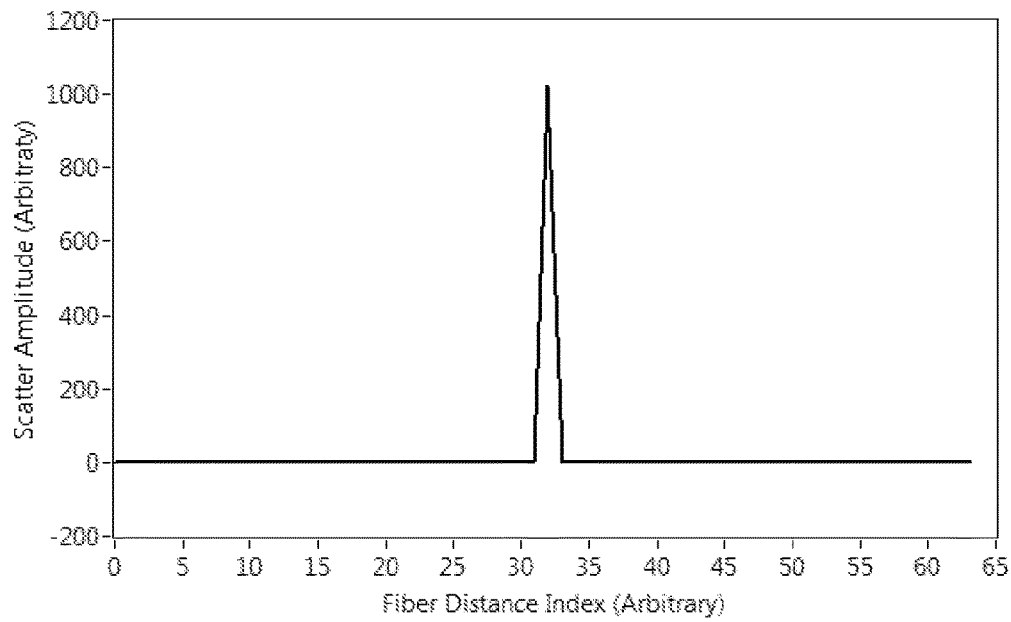
FIG. 4 shows an example discrete reference reflector at a location along the length of a simulated optical fiber.
Figure 5:
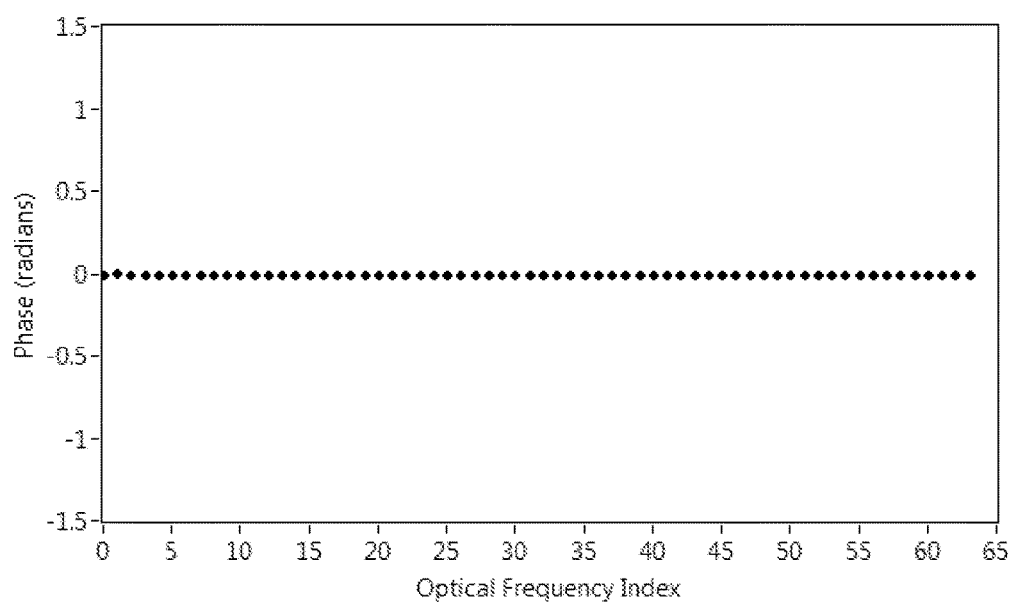
FIG. 5 shows an example discrete reference reflector having a zero-valued phase response across the scanned optical frequencies.

To further illustrate this process, consider FIG. 4 in which the scatter amplitude of an example discrete reference reflector is depicted as a function of fiber distance. The known phase response, in this example, for this reference reflector is a zero or near zero phase response across the optical frequencies of the tunable laser sweep of the OFDR measurement as shown in FIG. 5.

In the spectral domain, the point reference reflector reflects light uniformly over all frequencies. A point reference reflector generates a constant or near constant frequency OFDR interference signal. Therefore, its spectral phase response is a linear or near linear slope. This relationship is expressed in the equation below, where ω represents the frequency of the OFDR signal, $d\varphi_v/dt$ is the spectral domain phase response, $dv/dt$ is the laser scan rate, and T is the optical path delay of the reference reflector.

$$\omega = \frac{d\phi_v}{dt} = 2\pi \frac{dv}{dt} \tau_{ref} \quad (4)$$

Figure 6:
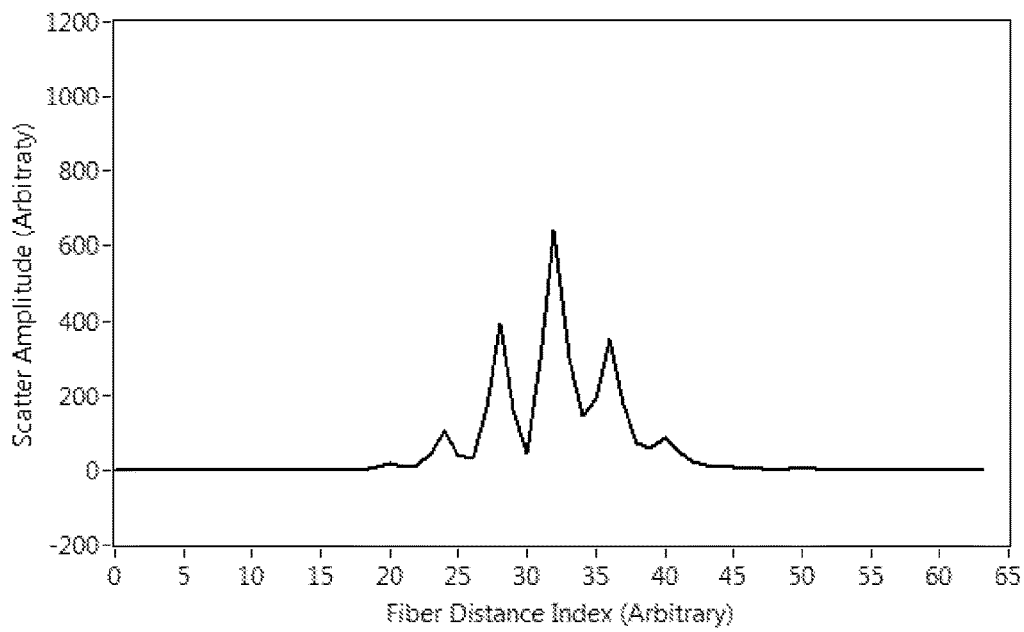
FIG. 6 shows an example discrete reference reflector distorted by an error signal applied to the OFDR data.
Figure 7:
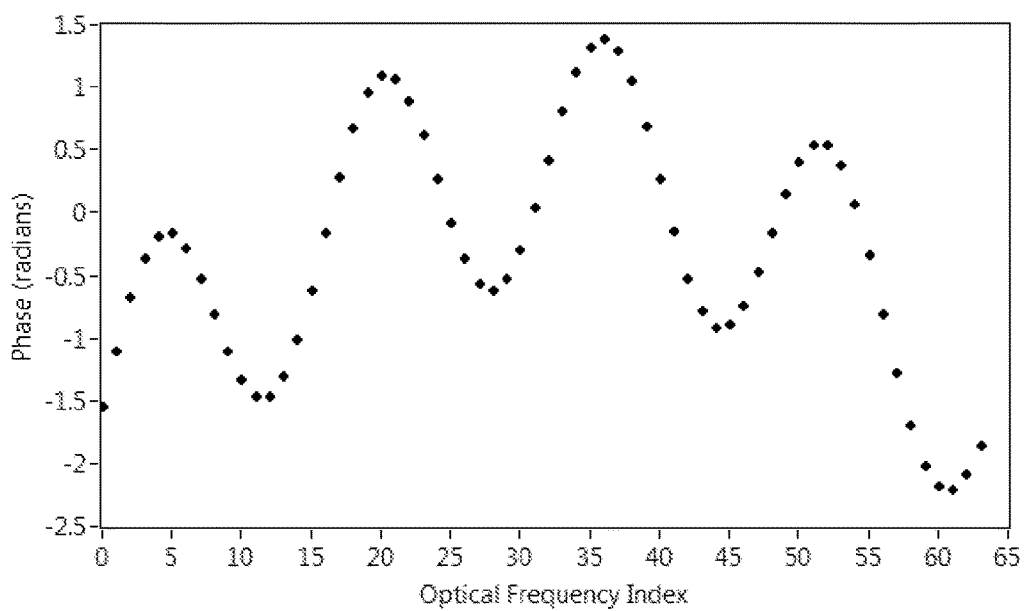
FIG. 7 shows an example extracted error signal from the response of the reference reflector.

A simulated error signal (e.g. a vibration) is applied to the data of the example point reference reflector shown in FIG. 4 producing a distorted amplitude response as shown in FIG. 6. The measured OFDR response of the point reference reflector has been smeared over a distance of the optical fiber and has changed in its reflective profile. One method of strain sensing along the length of an optical fiber is performed by cross correlating the amplitude response of segments with segments of an unstrained baseline OFDR measurement. These distortions are problematic for a cross correlation-based approach. However, applying the example method outlined in FIG. 3, a measure of the error signal is obtained and is shown in FIG. 7. This error signal is contained in the derivative of the spectral domain phase response, as described in the equation below. In this function, the OFDR interference frequency of the reference reflector is no longer constant and ω(t) now varies with time. This variation is driven by the reflector's change in delay with time, represented by Δτ(t). The error signal Δω(t) is defined as the time-varying component of ω(t).

$$\omega(t) = \frac{d\phi_v}{dt} = 2\pi \frac{dv}{dt} [\tau_{ref} + \Delta\tau(t)] \quad (5)$$

$$\Delta\omega(t) = 2\pi \frac{dv}{dt} \Delta\tau(t) \quad (6)$$

Sinusoidal oscillations in the error signal typically cause side lobes to manifest about a point reflector and are often associated with motion of the sensing fiber. Error responses with a second order component typically cause a broadening of the reflection peak over a distance of the fiber and are typically associated with chromatic dispersion or motion occurring on a timescale comparable to the duration of the tunable laser sweep.

In existing OFDR strain sensing applications in which the fiber's back-reflection is dominated by Raleigh scattering, a relatively weak, uniform scattering amplitude is observed along the length of the optical fiber with a broadband scattering profile reflected from each location. Hence, this type of fiber weakly scatters all optical frequencies of the tunable laser sweep with a similar intensity along the entire length of the sensing fiber.

A fiber Bragg grating (FBG) fiber may also be used to produce continuous strain measurements. FBGs are inscribed into the optical fiber during manufacture, each of which typically reflects a discrete optical frequency or range of frequencies with similar intensity along the length of the sensing fiber. Continuous FBG fibers are constructed such that the written FBGs are in close proximity to neighboring FBGs, sufficiently close such that the "gaps" between adjacent gratings do not produce errors in the continuous measurement of strain. Continuous strain applications using OFDR commonly have spatial resolutions on the order of 50 micrometers.

Due to the similarity of scattering amplitude along the length of the sensing fiber, discrete reflective events with amplitude elevated above the sensing background are not observed in a practical optical fiber. Therefore conventionally, a discrete reflector of elevated amplitude is considered a defect in a manufactured optical sensing fiber. Hence, in a fiber with near uniform scattering amplitude, it is difficult to isolate the response of a localized reflector. Without elevated amplitude, signals of similar amplitude from neighboring segments of fiber will mask the measurement of the spectral domain response of the desired reflective event.

The inventors realized that if a fiber is manufactured with discrete reference reflectors distributed along the sensor length, as described above and shown in 21 in FIG. 1, these discrete reference reflectors allow distortions in the OFDR data to be extracted at their individual locations in the sensing fiber. These discrete reference reflectors are designed to have a higher amplitude relative to neighboring reflective events such that neighboring signals, e.g., associated with Rayleigh scatter and/or FBGs, are readily distinguished from and do not overpower or mask the measure of the desired error signal determined using the reference reflector response at that location in the fiber. Further, the reflective event should reflect a broad spectral response such that an error signal can be measured across all optical frequencies swept during the tunable laser sweep of the OFDR measurement.

Figure 8A:
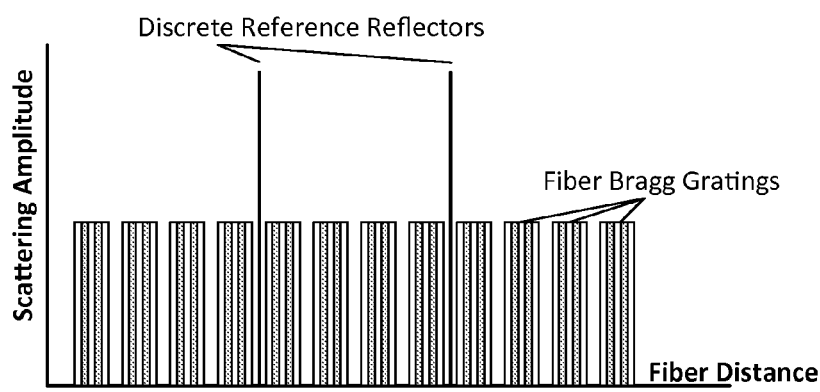
FIGS. 8A and 8B compare example scattering profiles of an FBG relative to an example discrete reference reflector.
Figure 8B:
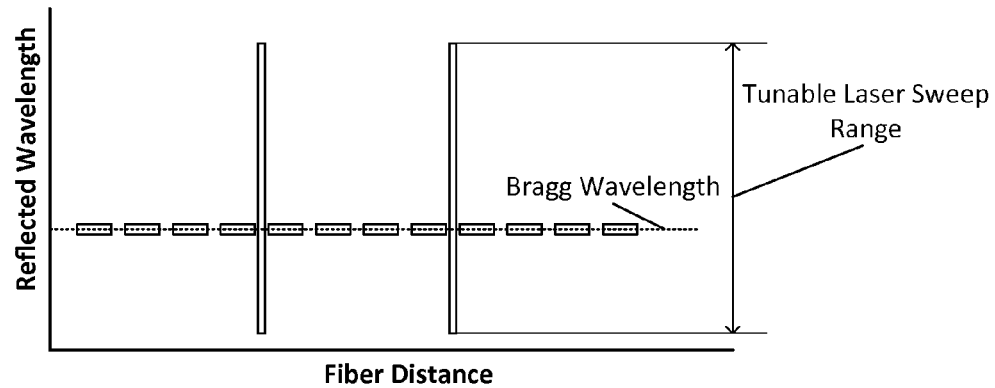

As an example, consider the comparison of the scattering responses of a continuous FBG and a discrete reference reflector as shown in FIG. 8. An FBG is constructed by inducing a periodic, prescribed change in local index of refraction along a length of optical fiber such that a single optical frequency, or wavelength, is reflected from that grating. In contrast, a discrete reference reflector is designed to have a very small length and reflect a broadband response over a wide range of optical frequencies. As described previously, a continuous FBG fiber may contain periodic gaps between adjacent gratings and is typically constructed with a uniform scattering amplitude. The discrete reference reflectors are designed reflect significantly more optical intensity over the measured optical frequency range than the scatter amplitude from the FBGs as shown below.

Measurement of Vibration at Multiple Points

Figure 9:
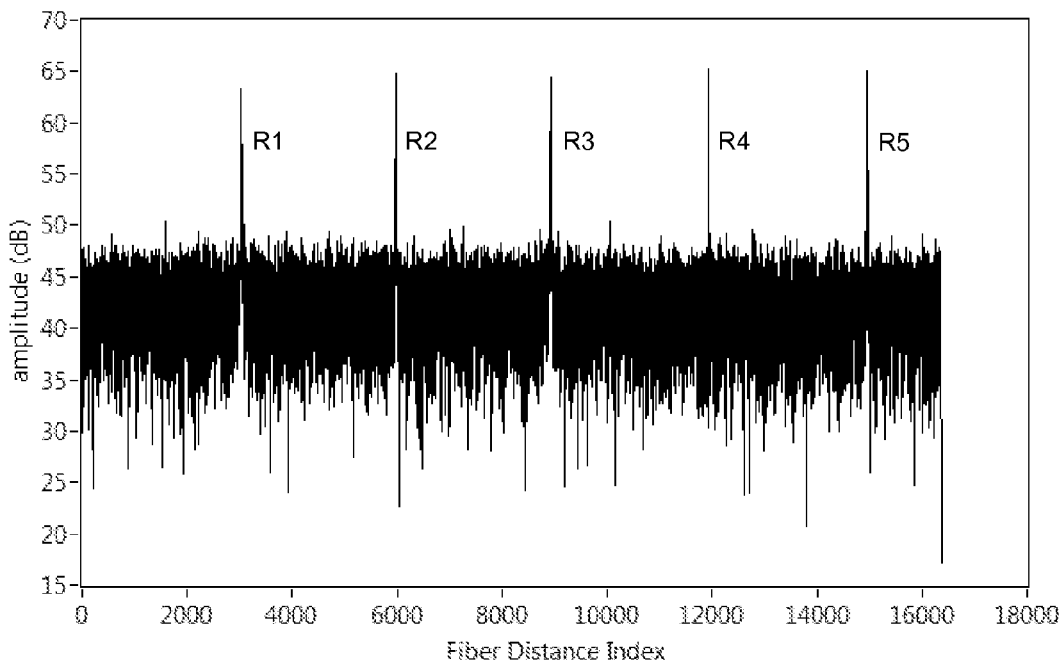
FIG. 9 illustrates an example, simulated optical fiber with periodic, discrete reflective events.

A simulated fiber with periodic, discrete reflective events corresponding to discrete reference reflectors is shown in FIG. 9. Discrete reference reflectors are modeled at locations separated by approximately 2500 delay-domain samples, each with a relative amplitude of approximately 65 dB. Continuous strain sensing would be performed along the length of the sensor with the Rayleigh scatter signature observed uniformly at approximately 45 dB. Each of the discrete events serve as locations along the length of the fiber that allow a direct measure of the accumulated error signal, e.g., due to vibration, up to that location in the sensing fiber.

As an example, a uniform motion is applied to the data describing the fiber shown in FIG. 9. The technique described above measures the total time-of-flight delay measured at the reference reflector, as it changes throughout the laser sweep. For a dynamic strain $\varepsilon(t; \tau)$, the resulting change in total time of flight delay $\Delta\tau$ accumulates according to the integral relationship below, where $\tau_{obs}$ represents the nominal delay at an observation point in the fiber and $C_\varepsilon$ is a coefficient which converts strain to units of time-of-flight delay change.

$$\Delta\tau(t;\tau_{obs}) = C_\varepsilon \int_{\tau=0}^{\tau_{obs}} \varepsilon(t;\tau) d\tau \qquad (7)$$

In this example, the simulated dynamic strain varies sinusoidally in time, but is uniform in delay (length) along an entire length of the sensing fiber. Because it is uniform with length, the resulting delay-domain error signal accumulates linearly as the effects of the motion constructively interfere along the length of the sensing fiber.

$$\Delta\tau(t;\tau_{obs}) = C_\varepsilon \tau_{obs} \cdot \varepsilon_{uniform}(t) \qquad (8)$$

Since these discrete reflectors are uniformly spaced, a uniform increase in this particular error signal will also be observed.

Figure 10:
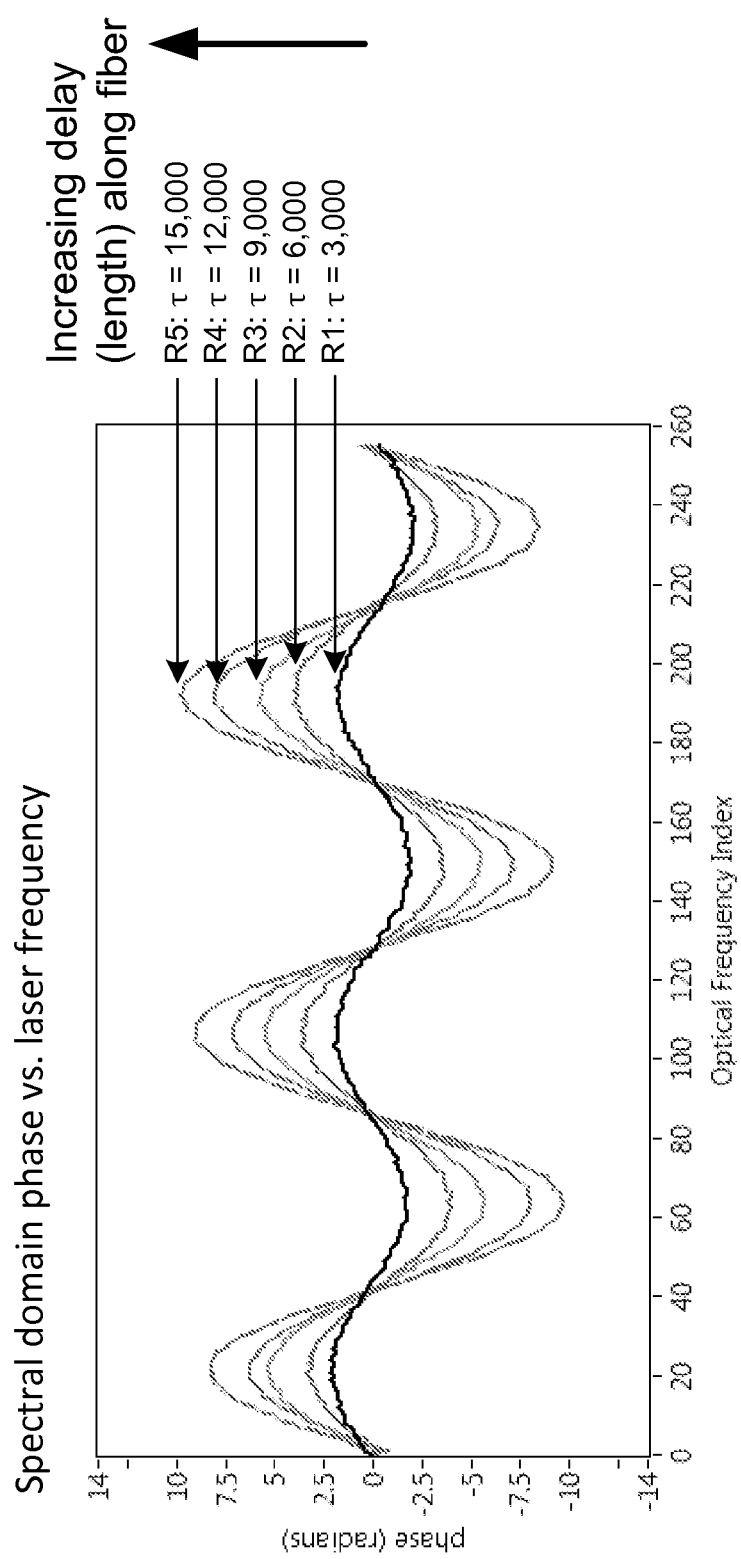
FIG. 10 shows multiple example plots of a spectral-domain phase error signal recovered from multiple discrete reference reflectors.

FIG. 10 depicts the measured error signal $\Delta\omega(v)$ at each of the five reference reflective events along the length of the fiber as obtained using the example method described in conjunction with the flow diagram of FIG. 3. The peak amplitude of each error signal is linearly dependent on the reference reflector's delay along the fiber. FIG. 10 shows that the amplitude of the error signal increases with length of the sensing fiber experiencing motion. This illustrates accumulation of the effects of dynamic strain along the length of the sensing fiber. Without discrete reflectors placed along the length of the sensing fiber, it becomes increasingly difficult to extract a measure of the error signal. Under perturbation, the observed delay location of a group scatterers sweeps back and forth over a large delay range during the course of the scan. If the effects of vibration are allowed to accumulate over long sensor lengths, it becomes particularly challenging to measure these local error signals because they are smeared over too wide a delay range.

As explained in detail later below, the measured error signal can be used to compensate the OFDR measurement for such perturbations in proximity of its associated discrete reference reflector.

Manufacture of Reference Reflectors

Reference reflectors may be manufactured in various ways. Example manufacturing techniques described aim to produce reflectors that exist at a single point in the fiber, occupying a length shorter than the OFDR system's length of merit. This ensures the reference reflector can produce a high-quality vibration measurement, in the presence of strain gradients, with minimal impact on the sensor's ability to perform distributed measurements. In OFDR sensing systems, this length is approximately equal to or smaller than the measurement resolution of the discrete delay-domain data, e.g., on the order of 50 µm. Other embodiments include implementations in which the reference reflector is narrower than the length of an OFDR strain/temperature processing gage or continuous phase measurement spatial filter width (e.g., 5-10 mm in length). The reflection from each reference occupies a significant portion, if not all, of the laser's spectral-domain sweep. The amplitude of reflection is tuned relative to the distributed sensor's signal level. For example, the amplitude of reflection is tuned so that it is high enough to generate a high-quality measurement of spectral domain phase, but low enough to allow distributed OFDR sensing algorithms to operate on data in the region surrounding the reference reflector.

Figure 11:
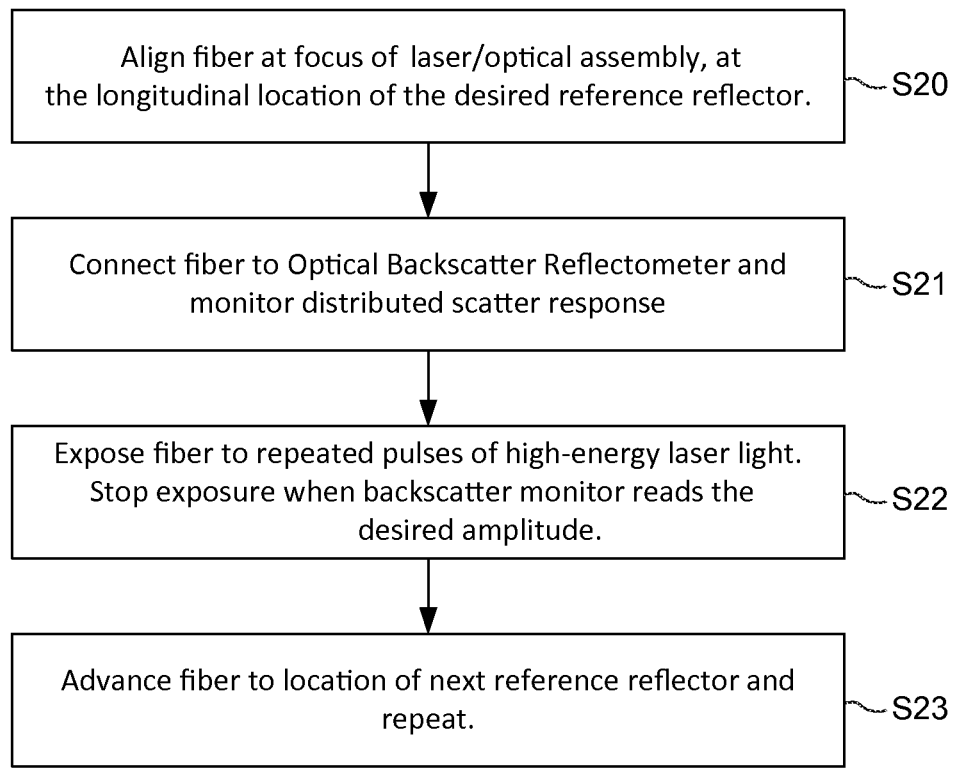
FIG. 11 illustrates a flowchart showing a non-limiting example process for manufacturing a sensor fiber including reference reflectors.

In one example embodiment, reference reflectors are written into the fiber with a series of high-energy laser pulses, each lasting less than a few picoseconds as shown in the flowchart of FIG. 11. The laser is focused on a point in the fiber's core (S20). The reflected signal is observed using OFDR or other techniques while laser pulses are launched into the fiber (S21). The laser pulses cease when the reflectivity of the reference reaches the desired amplitude (S22). A spooling mechanism is used to advance the fiber to bring the location of the next reference reflector in front of the laser (S23). This process repeats until the string of reference reflectors is manufactured.

Use of an ultrafast pulsed laser produces high-quality point reflectors with tunable amplitude and has the additional advantage of being able to modify the fiber's core with minimal damage to the coating that can be easily repaired, if needed. In other words, the ultrafast laser technique eliminates the need for special fiber coatings.

In another example embodiment, a continuous-wave ultraviolet (CW-UV) laser is used instead of a pulsed laser. The fiber is either drawn with a specialized "write-through" coating that transmits UV light, or its coating is locally stripped to prepare a selected region for writing of a reference reflector. Prior to manufacture, the fiber is prepared by exposing it to hydrogen for an extended period of time. The UV laser is then focused on the core of the fiber to create a point. Amplitude monitoring and mechanical advancement schemes similar identical to that described above may be used.

In another embodiment, a pulsed laser is used to generate high-quality point reflectors in the fiber on the draw tower, after the fiber is drawn to its final diameter be before the coating is applied.

Example embodiments described above represent techniques for manufacturing point reflectors. Ultrafast and CW-UV lasers are both known for writing periodic Fiber Bragg Gratings (FBGs) in the fiber's core. A chirped FBG example embodiment uses one of several known interference techniques to write a short, broad-spectrum grating in the fiber to serve as a reference reflector. The grating's overall length is made to be as short as possible. Its period is chirped or modulated so that it reflects light over most or all of the OFDR interrogator's sweep range.

The above examples describe manufacturing embodiments in which the discrete reference reflectors are produced directly in the sensing fiber. However, the above example embodiments can also be used to produce a series of reference reflectors in a secondary fiber. In this approach, the reference reflectors are then located, cut out of the secondary fiber, and spliced into the sensing fiber in the desired locations.

When designing the sensor to contain reference reflectors, those skilled in the art will appreciate that the amplitudes and locations of individual reflectors represent a design consideration. In addition to measurement performance, consideration may also be applied to ensure that the OFDR signal is not degraded by multiple-reflection effects. These effects may include OFDR interference between multiple reflectors or the appearance of spurious reflection peaks resulting from multiple reflections. By keeping the reflectors' higher amplitude below a threshold level and/or varying the spacing and amplitude of individual reflectors, the sensing fiber can be manufactured to minimize the introduction of spurious reflections or interference terms To demonstrate feasibility of this technology, multiple reference reflectors were written into the last several meters of a 10 meter long commercially available Corning Low Bend Loss (LBL) optical fiber using a Titanium Sapphire (Ti:Sapphire) pulsed laser. Using a Luna Optical Backscatter Reflectometer, a commercial system used to measure the scattering properties of optical fiber, a measure of the scattering amplitude along the length of the optical fiber was obtained and the results are shown in FIG. 12.

Figure 12:
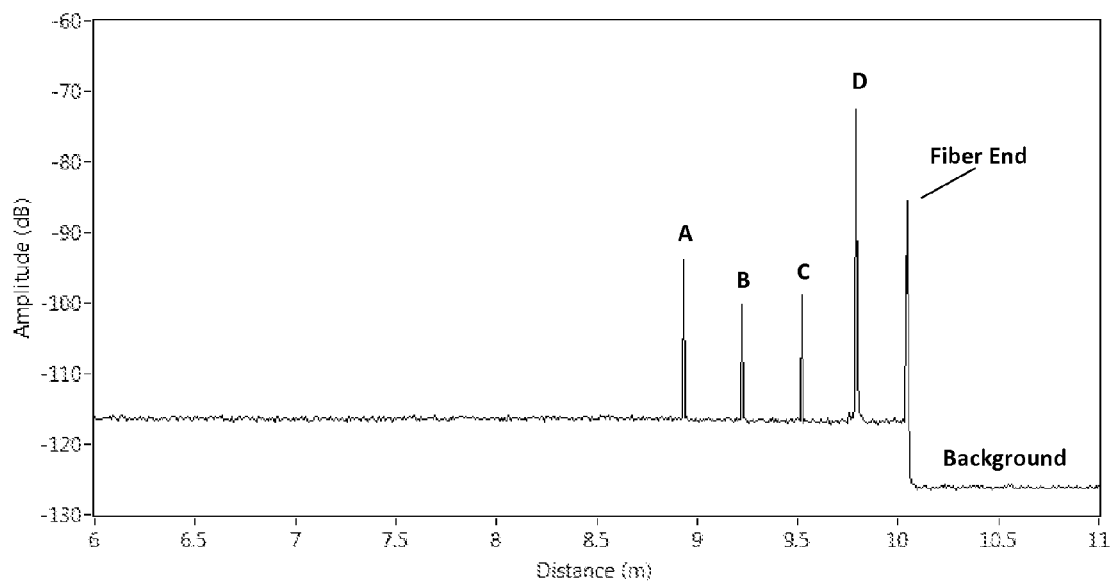
FIG. 12 shows an example optical backscatter reflectometer measurement of scattering amplitude for a sensing fiber with inscribed reference reflectors.

As seen in the example optical backscatter reflectometer measurement of scattering amplitude shown in FIG. 12, four discrete reference reflectors have been placed at the end of the LBL fiber as evidenced by large-amplitude spikes in the back-scattered light. The end reflection of the optical fiber is observed at approximately 10 meters as evidenced by the drop in scattering amplitude to background levels.

Return Loss is an industry standard of quantifying the amount of light reflected from a particular location. For reference, a typical bulk optical connector will have Return Loss measurements of −60 to −70 dB. The following table depicts the return loss measurements for each of these manufactured reflective events.

| Fiber Event | Return Loss (dB) |
| --- | --- |
| Point Reflector A | −67.23 |
| Point Reflector B | −72.87 |
| Point Reflector C | −71.82 |

-continued

| Fiber Event | Return Loss (dB) |
| --- | --- |
| Point Reflector D | −46.10 |
| Fiber End Reflection | −59.10 |

Figure 13:
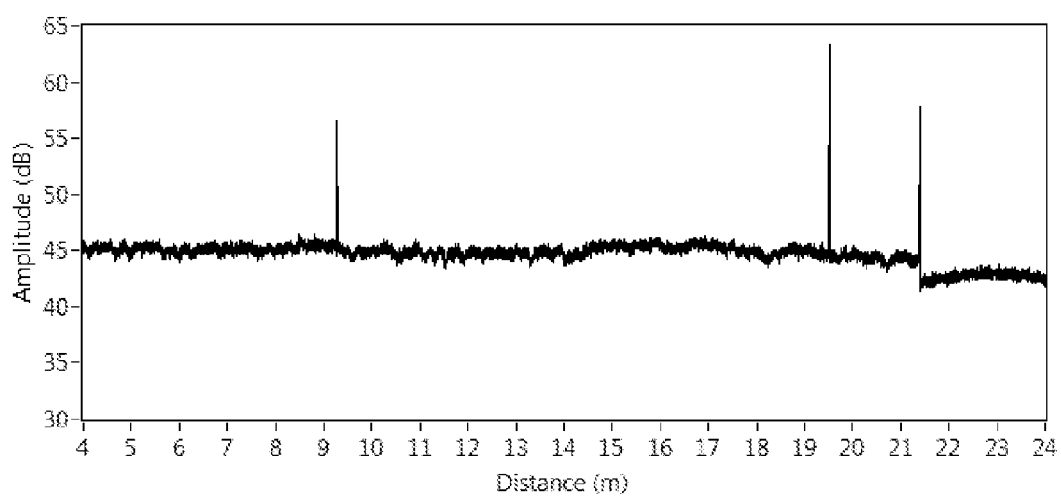
FIG. 13 illustrates an example scattering response for a strain sensing fiber in which two discrete reflectors were spliced into the length of the sensing fiber.

To illustrate the use of a discrete reference reflector to improve the strain sensing at a location in the fiber, the reflectors manufactured and shown in FIG. 12 were cut out of the optical fiber and spliced into a new sensing fiber. Two discrete reference reflectors were placed into a strain sensing fiber such that their locations were separated by 10 meters. The scattering profile for this fiber is shown in FIG. 13 which depicts the first discrete reflector, originally Point Reflector A, at approximately 9 meters with a second reflector, originally Point Reflector D, placed at approximately 19 meters along the length of the sensing fiber.

Figure 14:
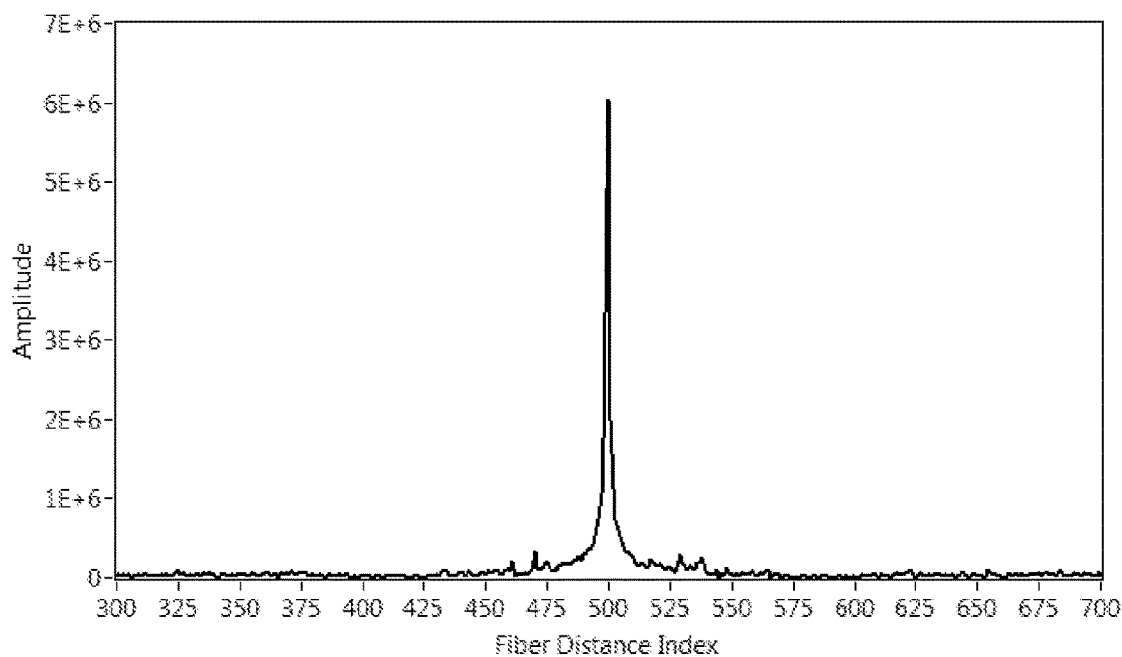
FIG. 14 shows a close up of the reflective profile of the discrete reflector at 9 meters in a resting state from FIG. 13.

A detailed view of the discrete reflector at a distance of approximately 9 meters is shown in FIG. 14. A sharp reflective peak is observed with little distortion. The reference reflector exhibits a full-width, half-maximum width of approximately 110 μm, equivalent to 2.25 OFDR delay-domain samples at 50 μm per sample.

Measurement and Correction of Vibration

Figure 15:
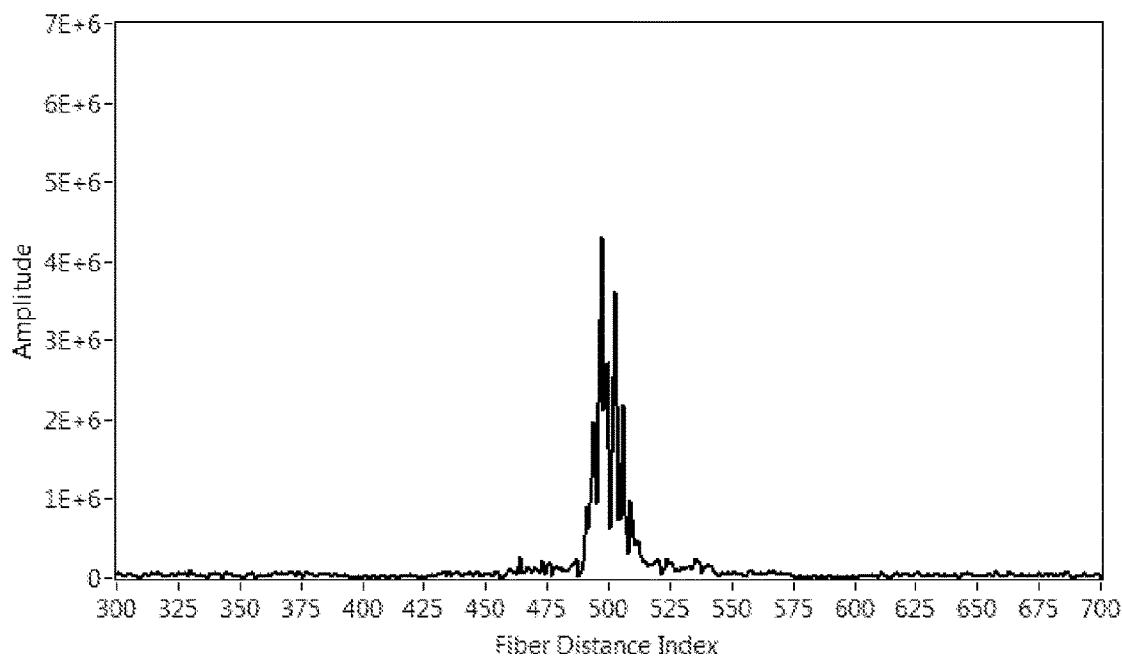
FIG. 15 shows a distorted response of a discrete reflector due to motion of the sensing fiber lead in the example from FIGS. 12 and 13.

A motion applied to the lead of the fiber results in a motion response uniformly distorting the strain measurement along the length of the sensing fiber. The discrete reflector at 9 meters is once again shown and is now observed to be distorted by the motion applied to the sensing fiber as observed in FIG. 15.

An error signal is extracted from this discrete reflector by isolating the data in the delay domain centered at the location of the discrete reflector, and transforming the response to the spectral domain. Next the phase argument of this complex-valued spectral response is extracted and subtracted from the known response of the discrete reflector under ideal, static conditions. This process produces a measured error signal from that location in the sensing fiber. The extracted, measured error signal from the discrete reflector at 9 meters is shown in FIG. 16.

Figure 16:
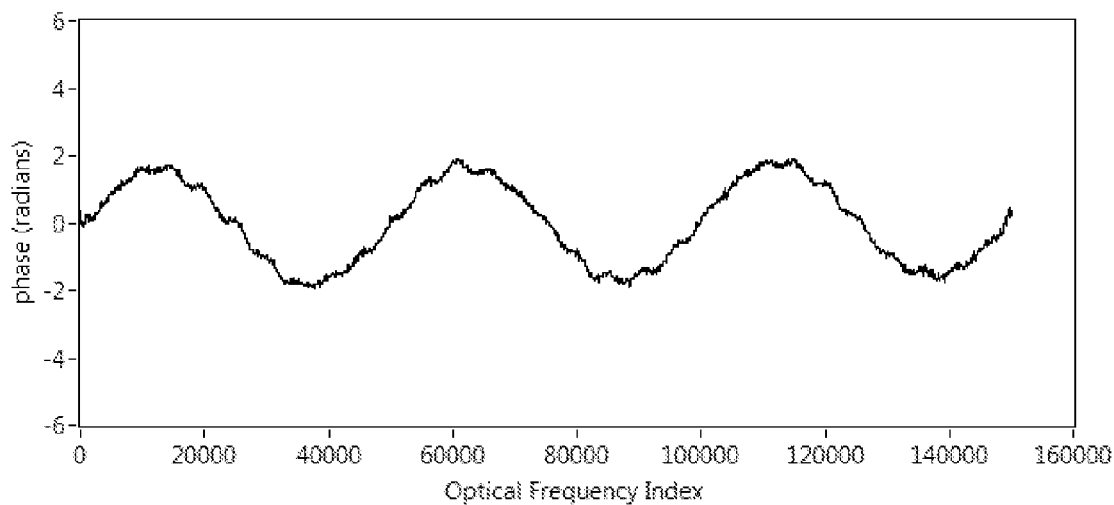
FIG. 16 is a graph showing an extracted error signal from the discrete reflector located at 9 meters along the length of the sensing fiber in the example from FIGS. 12 and 13.
Figure 17:
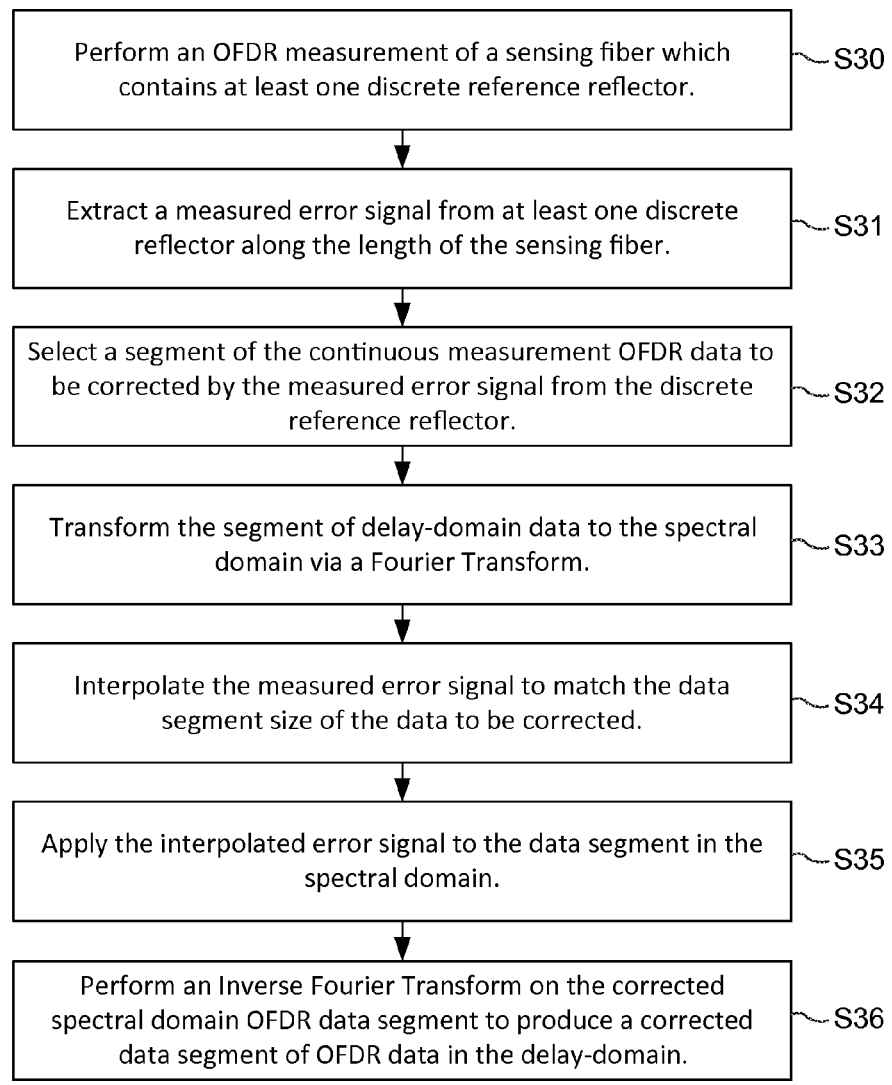
FIG. 17 is a flowchart diagram of an example correction of OFDR measurement data through the use of an error signal extracted from a discrete reference reflector.

The measured error signal shown in FIG. 16 can be used to compensate the OFDR measurement in proximity of the discrete reference reflector. An example method of performing this compensation is described in the flow diagram shown in FIG. 17 implemented using the data processor 30 shown in FIG. 1.

In this example method, the correction is performed in segments. A segment is defined as a length of continuous delay-domain OFDR data selected for application of a vibration correction signal, which is derived from a given reference reflector. A segment is paired with an individual reference reflector, and therefore in an example embodiment in which a continuous correction is generated from multiple segments, the segment length defines the distance between reference reflectors. Because reference reflectors are processed without the need for a-priori knowledge of cumulative changes in state along the length of the fiber, the measurement and correction for vibration can be processed for multiple segments in parallel. This greatly improves the efficiency of application to practical distributed measurements.

In S30, an OFDR measurement of a sensing fiber is performed that includes at least one discrete reference reflector. A measured error signal is extracted from the at least one discrete reference reflector along the length of the sensing fiber (S31). To compensate for the measured error signal, a segment of measurement OFDR data to be corrected is isolated in the delay domain (S32). This segment of data is transformed to the spectral domain via a mathematical Fourier Transform (S33). The measured error signal from the discrete reflector is interpolated such that its segment size (number of points) matches the size of the measurement segment to be corrected (S34). The spectral-domain phase correction signal g(v) is described mathematically below. Note that the time-varying delay is proportional to the derivative of spectral-domain phase, and therefore the total phase correction is proportional to its integral over the frequency range swept by the laser.

$$g(v) = -2\pi \frac{dv}{dt} \int_{v_0}^{v} \Delta t(\zeta) d\zeta \qquad (9)$$

The interpolated signal is applied to the measurement spectral domain data (S35). This can be done by placing the real-valued error signal into a complex valued format with amplitude of unity and multiplying the correction against the complex valued spectral domain data. This correction is described in the expression below, in which x(v) is the original OFDR signal in the spectral domain, and x̃(v) represents the corrected spectral domain data. The corrected spectral domain measurement data is then returned to the delay domain through the use of an Inverse Fourier Transform (S36).

$$\tilde{x}(v) = x(v) \cdot e^{i \cdot g(v)} \qquad (10)$$

In this example, a segment of OFDR delay-domain data was extracted from the region of fiber just after the reference reflector located at 9 m. The vibration measurement obtained from the reference reflector was used to correct the OFDR signal through the process described above. Once corrected, the OFDR data is ready to produce high-fidelity measurement of strain, temperature, or other distributed phenomena.

For example, strain sensing may be performed by comparing a measured OFDR signal to a pre-recorded reference OFDR measurement of a sensing fiber. To produce a continuous measurement of strain, the measured OFDR data in the delay domain is compared against the reference OFDR measurement through a multiply of the measurement complex valued data $X_{meas}(\tau)$ to the complex conjugate of the reference data $X_{ref}(\tau)$. Extracting the phase argument of the result produces a measure of the change in optical phase along the length of the optical fiber $\Delta\varphi(\tau)$.

$$\Delta\varphi(\tau) = \arg\{X_{meas}(\tau) \cdot X_{ref}^*(\tau)\} \qquad (11)$$

As described in U.S. Pat. No. 8,773,650, incorporated herein by reference, this measure of change in phase is proportional to the change in length of the optical fiber relative to the length of the fiber in the reference OFDR measurement. A derivative of this change in phase is directly proportional to strain along the length of the sensing fiber.

This delay-domain phase comparison between the measurement data and pristine reference data can be used to evaluate the coherence of the measurement data set. If the measurement data is disturbed by vibration, its degree of coherence with the reference data is reduced, and the measurement of $\Delta\varphi(\tau)$ becomes noisy. Under high vibration, the phase comparison operation produces a $\Delta\varphi(\tau)$ signal that is indistinguishable from the noise background and is therefore unable to produce a valid strain measurement.

Figure 18A:
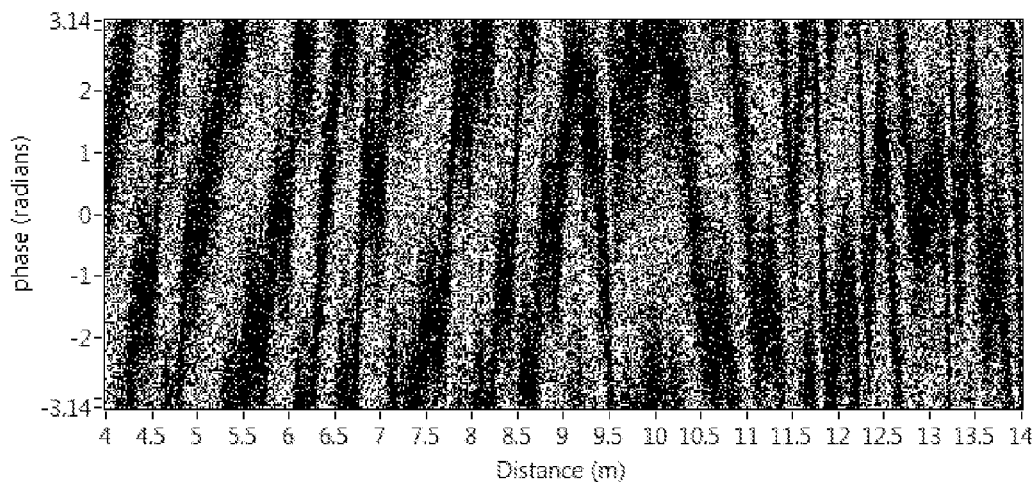
FIG. 18A is a graph of a delay-domain phase comparison between OFDR distributed Rayleigh scatter measurement data and reference data where the extracted phase result exhibits a high-level of noise.
Figure 18B:
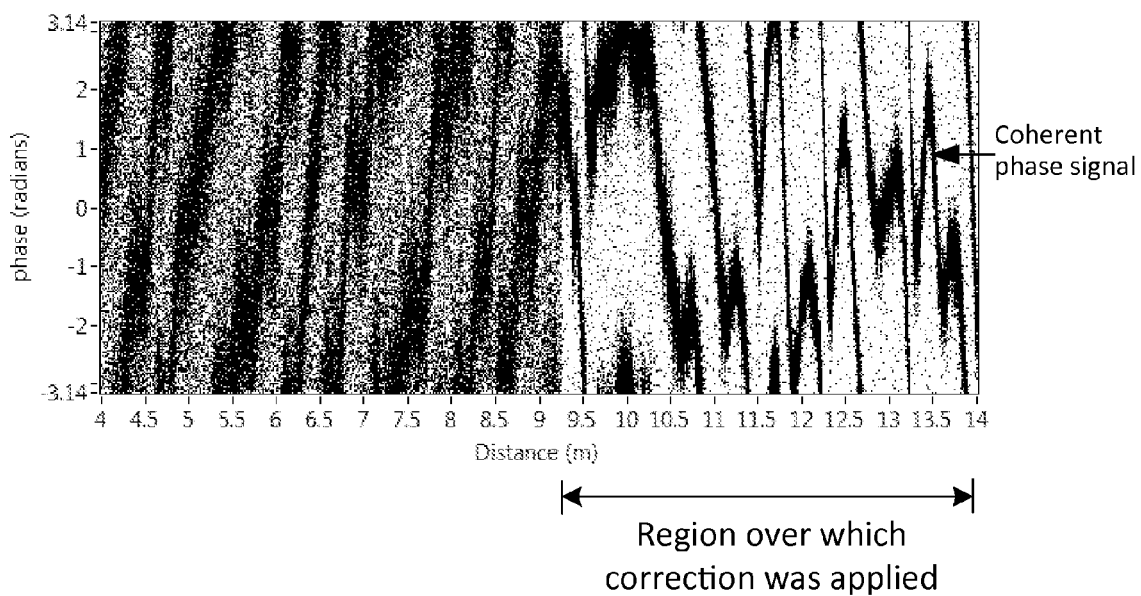
FIG. 18B is a graph of a delay-domain phase comparison between OFDR measurement data and reference data after vibration correction to measurement data showing that the extracted phase signal exhibits significantly lower noise due to improved coherence.

Returning to this example, the motion applied to the lead of the fiber increased the amount of noise in this phase measurement as shown in FIGS. 18A and 18B, which are graphs of a delay-domain phase comparison between OFDR measurement data and reference data. All data is represented as black points on a white background. In FIG. 18A, the extracted phase result exhibits a high-level of noise. In FIG. 18B, vibration correction of measurement data, the extracted phase signal exhibits significantly lower noise due to improved coherence. Specifically, FIG. 18B shows the phase difference between the corrected measurement data and the pristine baseline data. The region between 9 and 14 m in length, in which the vibration correction was applied, shows significantly more clarity in the extracted $\Delta\varphi(\tau)$. The graphs in FIGS. 18A and 18B illustrate how the technology described in this application improves the coherence of OFDR data for the purpose of sensing in the presence of vibration.

Use of Multiple Reference Reflectors

Figure 19:
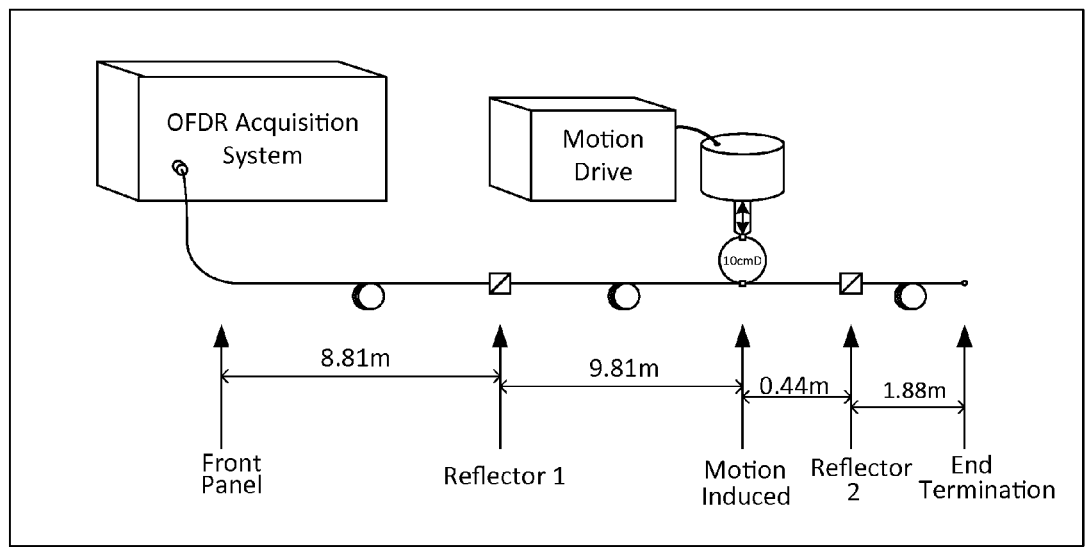
FIG. 19 illustrates an example of a local motion signal applied between two discrete reflectors.
Figure 20:
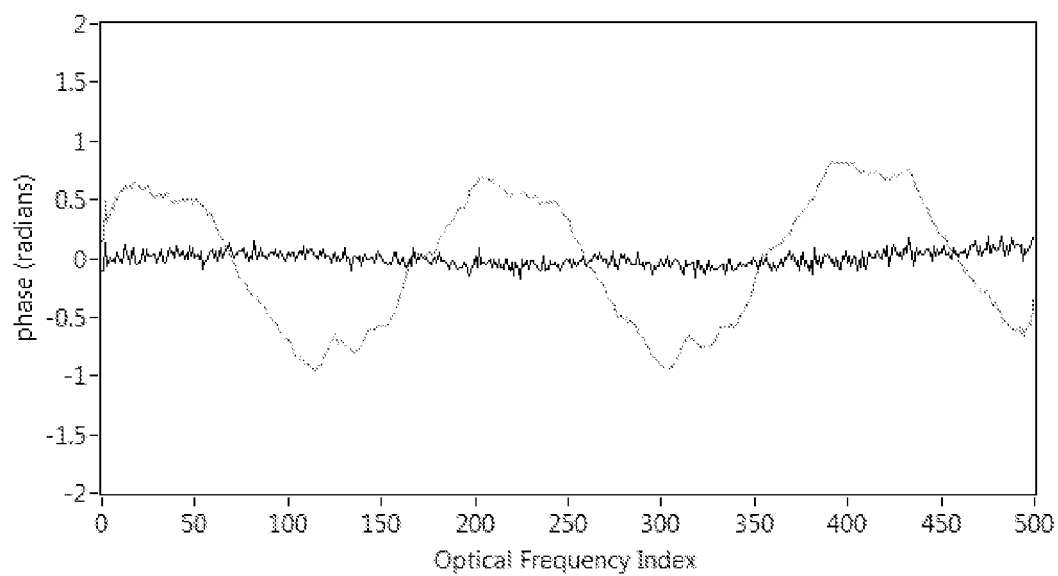
FIG. 20 shows an example phase response where the motion profile is not observed in the error signal measured at the first discrete reflector (phase is substantially zero) while the second error signal does show a motion profile (phase is substantially changing above and below zero phase).

A further test setup was constructed in which a motion was applied to between two discrete reference reflectors as illustrated in FIG. 19. In a practical sensing environment, it is anticipated that a deployed optical sensor will experience a non-uniform motion profile along the length of the sensing fiber. Hence, periodically placed discrete reflectors will allow the signal to be recovered along the length of the fiber by relying on the measured error signals of discrete reflectors in proximity to that location in the fiber. In the setup illustrated in FIG. 19, a motion is induced between the two discrete reference reflectors and the error signals as observed by each reflector is illustrated in FIG. 20. No motion profile is observed in the error signal measured from the first discrete reference reflector (near zero phase) while the second discrete reflector shows an error (changing phase) as induced by the motion drive. This data illustrates the use of a reference reflector to measure the effect of dynamic strain in the region of fiber local to that reflector.

Figure 21:
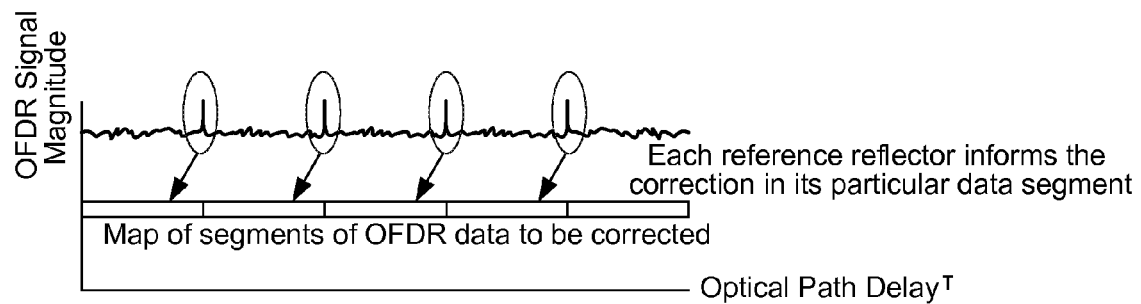
FIG. 21 shows an example illustration of segmented data correction performed using multiple reference reflectors.
Figure 22:
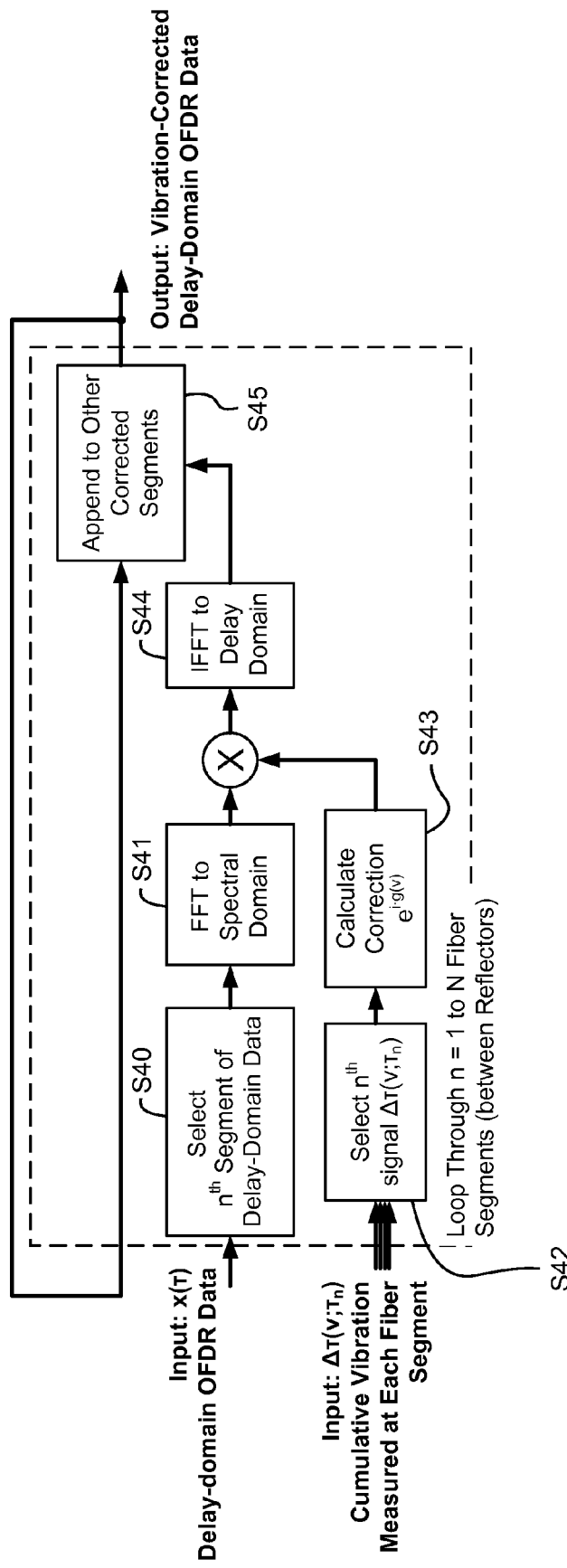
FIG. 22 is a flow diagram for example embodiment of segmented data correction using multiple reference reflectors.

Because each reference reflector measures the localized effect of dynamic strain, multiple reference reflectors can be used to generate a piecewise-distributed correction to the OFDR data signal. In one example embodiment, this correction is performed in segments. FIG. 21 illustrates the segmentation of OFDR data, and FIG. 22 shows example vibration correction procedures. Each reference reflector is paired with a segment of data. FIG. 21 illustrates an example embodiment in which each reference reflector is at the end of its data segment, but the data segments can also be positioned such that their corresponding reference reflectors are located at the start, in the middle, or anywhere near the data segment.

The error signal measured from each reference reflector is used to generate a vibration correction according to example method(s) described above. This correction is applied individually to each segment of fiber, and then the corrected segments are synthesized to produce a corrected OFDR measurement data set. The flow diagram in FIG. 22 illustrates an example embodiment of this correction process. In this example, each delay-domain segment is selected via a windowing function (S40), and a Fourier transform (e.g., an FFT) is performed to convert the data to the spectral domain (S41). Then, a correction is calculated from the measurement of $\Delta\tau$ at the delay location corresponding to the selected segment (S42, S43). This correction is applied using the complex multiply technique described previously. An inverse Fourier transform (e.g., an IFFT) converts the data back to the delay domain (S44). This process is repeated for all of the data segments. At the output, the windowed data segments are added to produce a motion-corrected (e.g., vibration-corrected) delay-domain OFDR measurement data set (S45).

The example segmented correction procedures described above apply the same correction function to all of the OFDR measurement data in a given segment. Because each reference reflector measures the effects of vibration at a point location, this correction is most valid at or near the position of the reference reflector. In the case where dynamic strain is applied along a length of fiber, the accumulation of strain with length causes this correction to become less valid farther away from the reference reflector. As a result, the choice of reference reflector spacing and segment length is preferably optimized to ensure that the correction from a single reflector is a close approximation to the dynamic change in delay exhibited across the entire correction segment. In one example practical application, the reflector spacing and segment length is small enough to ensure adequate correction of the vibration experienced by the sensor.

Because the discrete reflectors provide reference points in the measurement data which do not require comparison with the baseline reference data, they can be used to re-initialize the distributed calculation at each segment, if necessary. In one example embodiment, this initialization is performed as an initial delay alignment at the start of a distributed strain/temperature calculation. These initialization operations may be performed independently or in conjunction with optimization of a distributed OFDR sensing algorithm to produce a fully-distributed OFDR measurement after vibration correction.

Linearly-Distributed Correction

The error signal generated from a reference reflector may also be used to generate a distributed correction. This distributed correction accounts for the cumulative effect of a strain signal which is uniform along the length of the fiber. Such a strain signal may vary according to any suitable function in the time domain, provided that at any given time, the dynamic strain is uniform along the length of the fiber. This example case is analogous to a length of fiber held at two points as it is stretched and compressed in time. Under this length-uniform dynamic strain, the distributed correction is equally valid at all points along the fiber. In other words, the distributed correction accounts for the accumulation of dynamic delay resulting from the dynamic strain excitation.

Figure 23:
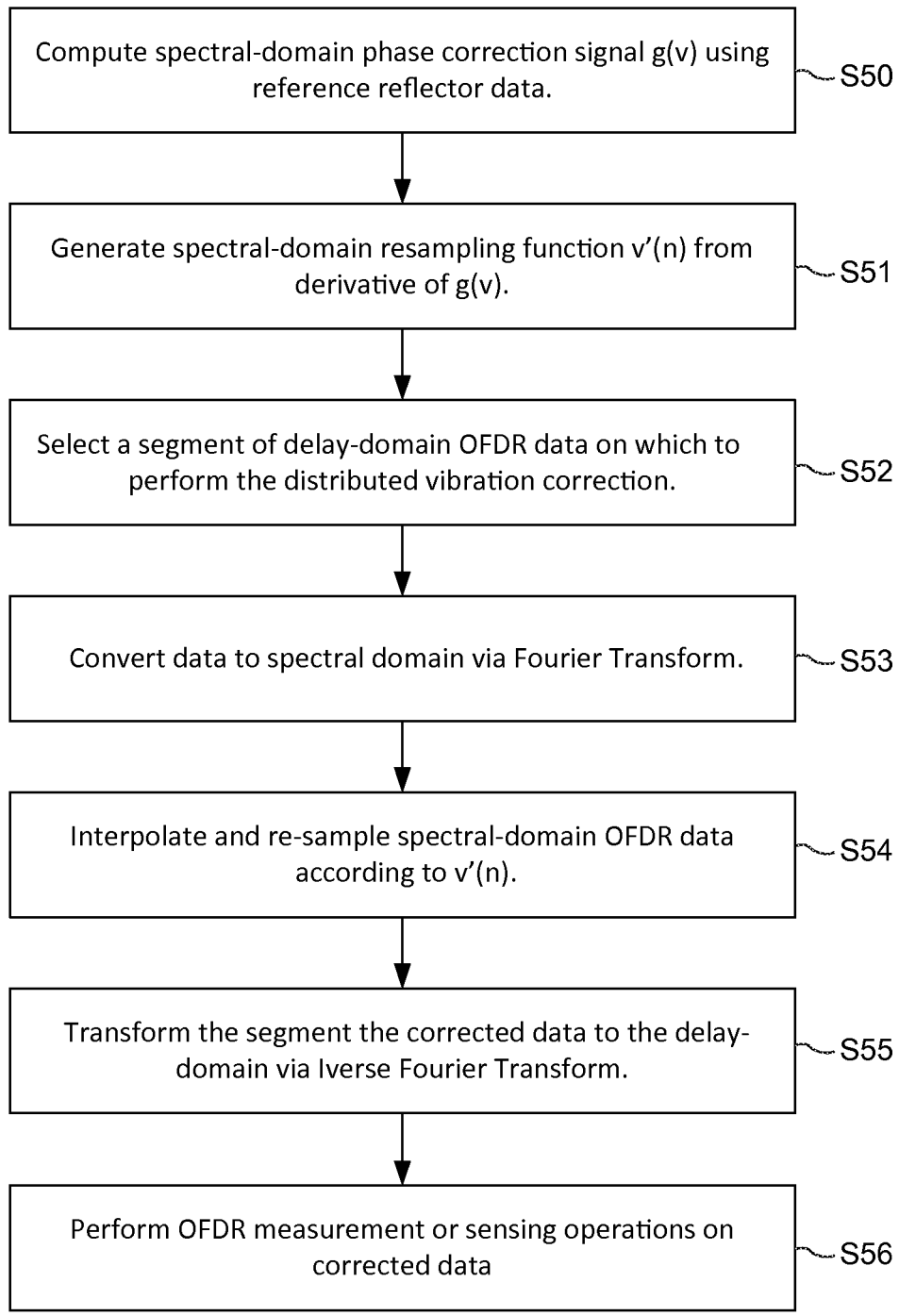
FIG. 23 is a flowchart showing example application of linearly-distributed vibration correction informed by reference reflector.

In an example embodiment shown in FIG. 23, the phase correction function g(v) for a discrete reference reflector is calculated by the methods described above using reference reflector data (S50). Then, the phase correction function g(v) is used to generate a resampling function, which re-defines the interval (in units of laser frequency) between adjacent samples in the OFDR spectral-domain data (S51). In the equation below, v(n) is the function which maps the $n^{th}$ spectral-domain sample in the OFDR data array to units of laser frequency. The correction function $\Delta v_n(n)$ is applied to create a new frequency mapping v'(n).

$$\Delta v_n(n) \propto \frac{d}{dv} g(v) = -2\pi \Delta \tau(v) \quad (12)$$

$$v'(n) = v(n) + \Delta v_n(n) \quad (1)$$

A segment of delay-domain OFDR data is selected for correction (S52), and a Fourier Transform is applied to convert the data to the spectral domain (S53). The OFDR data is corrected according to the spectral domain resampling function v'(n) via interpolation and resampling (S54). This resampling process may be performed using the same methods employed to re-sample the OFDR data to achieve a constant increment of optical frequency (see step S7 in FIG. 2). Implementation of resampling according to a non-constant perturbation function may also be performed using known methods described in U.S. Patent Application 2013077711, incorporated herein by reference.

This resampling step forces the frequency sample interval to change according to the derivative of the phase correction function, as described above. In essence, the correction mathematically stretches and compresses the fiber in time to undo the effects of dynamic strain.

The resampled data is then converted to the delay domain via Inverse Fourier Transform (S55), and subsequent OFDR measurements or sensing calculations are performed on the corrected data (S56). This correction is applied to the OFDR data at the same point in the calculation process as previously-described embodiments. It eliminates the effect of vibration in preparation for high-fidelity distributed sensing or device inspection. This correction may be applied in conjunction with the segmentation approach described above, producing a distributed linear correction within each segment.

Figure 24A:
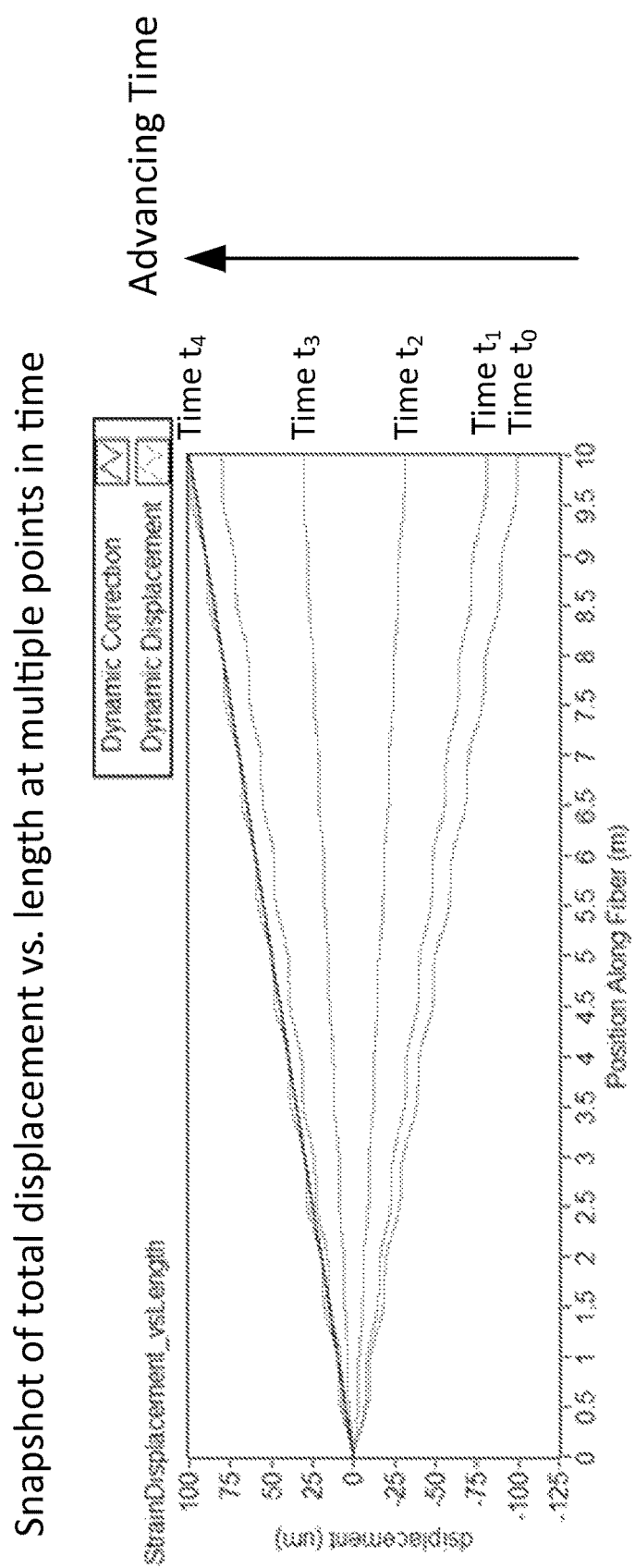
FIG. 24A shows a simulated example result of linearly-distributed vibration correction depicting total displacement vs. length along the fiber.
Figure 24B:
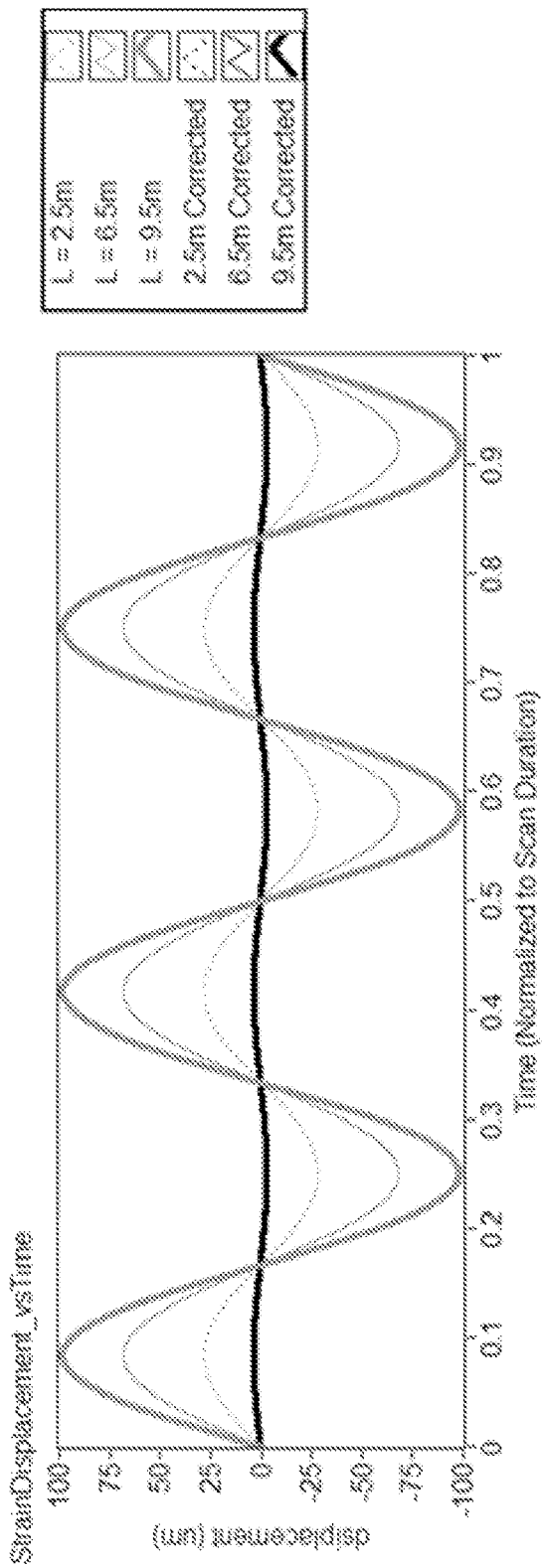
FIG. 24B depicts total displacement vs. time at three points along the fiber's length shown before and after a distributed correction.

The simulated result of this distributed correction technique is depicted in FIGS. 24A and 24B. A dynamic strain signal is simulated to contain a component which is constant with length and another component which varies along the length of the fiber. The length-uniform portion of the dynamic strain signal is significantly larger than the component which varies with both time and length. The entire strain signal oscillates sinusoidally in time.

FIG. 24A illustrates the total displacement vs. length due to dynamic strain. Each gray curve depicts a snapshot of the fiber vs. length at a given time. The uniform component of dynamic strain accumulates constructively along the length of the fiber producing a larger shift in delay at longer distances along the fiber's length. As time progresses, the amplitude of this strain pattern increases and decreases sinusoidally.

The dark black curve in FIG. 24A illustrates the effect of the linearly-distributed correction. In the figure, the correction is shown paired with a particular snapshot in time, but in practice, it is actually applied to the entire length of the fiber at all points in time. The technique described above corrects for the large accumulated dynamic delay change due to length-uniform dynamic strain, leaving only the smaller residual signal which varies with both time and length.

FIG. 24B depicts the same dynamic delay effect and correction vs. physical time. Each curve represents the time-varying delay at a different point in the fiber. Points farther along the fiber's length exhibit a larger shift in delay than those near the start of the fiber. After application of the linearly-distributed correction, these large cumulative shifts are eliminated, leaving only the smaller residual signal which varies with both time and length.

Although various embodiments have been shown and described in detail, the claims are not limited to any particular embodiment or example. None of the above description should be read as implying that any particular member, step, range, or function is essential such that it must be included in the claims scope. The scope of patented subject matter is defined only by the claims. The extent of legal protection is defined by the words recited in the allowed claims and their equivalents. All structural and functional equivalents to the members of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. An Optical Frequency Domain Reflectometry (OFDR) interrogation system for measuring a parameter of an optical sensing light guide comprising:
    an optical interferometric interrogator;
    the optical sensing light guide manufactured to have one or more localized reference reflectors with at least one reference reflector being located in a segment of the optical sensing light guide between the ends of the optical sensing light guide, each reference reflector configured to produce a reference scattering event having a known scattering profile including elevated amplitude relative to scattering detected for neighboring segments of the optical sensing light guide, where each of the segments of the optical sensing light guide is a length of contiguous optical sensing light guide that is useable to initialize and perform a distributed OFDR sensing operation;
    optical detection circuitry, coupled to the optical interferometric interrogator, configured to detect optical interferometric measurement signals for a length of the optical sensing light guide; and
    data processing circuitry configured to:
        receive interferometric measurement signals from the optical detection circuitry,
        generate an interferometric measurement data set for the length of the optical sensing light guide;
        isolate the interferometric measurement data set in proximity of each of the one or more reference reflectors including the at least one reference reflector;
        determine an error signal from the isolated data set for each of the reference reflectors;
        provide the error signal for correction of the interferometric measurement data set and/or reporting of the error signal.

2. The optical interrogation system in claim 1, wherein the segment is a contiguous length of sensing fiber ranging in length from several centimeters to tens or hundreds of meters.

3. The optical interrogation system in claim 1, wherein the segment does not include another reference reflector.

4. The optical interrogation system in claim 1, wherein the known scattering profile is associated with an interference in the spectral domain of a discrete frequency proportional to a distance to a location of the reference reflector along the length of the optical sensing light guide.

5. The optical interrogation system in claim 1, wherein the reference reflector has a length that is on the order of a measurement resolution of the interferometric measurement data set.

6. The optical interrogation system in claim 1, wherein the error signal is determined without requiring baseline OFDR data for the optical sensing light guide.

7. The optical interrogation system in claim 1, wherein the data processing circuitry is configured to correct the interferometric measurement data set locally for, at, or near each reference reflector with little or no a-priori knowledge of the state of the optical sensing light guide up to that point in the fiber.

8. The optical interrogation system in claim 1, wherein each reference reflector has a spectral domain response of substantially constant magnitude and substantially increasing and substantially known variation in phase over a range of optical frequencies swept by a tunable laser source.

9. The optical interrogation system in claim 1, wherein each reference reflector distinguishable from Rayleigh scattering and/or scattering associated with fiber Bragg gratings (FBGs).

10. The optical interrogation system in claim 1, wherein the error signal compensates the interferometric measurement data set for time-varying perturbations such as vibration effecting the optical sensing light guide and distorting the interferometric measurement data set of the parameter of the optical sensing light guide.

11. The optical interrogation system in claim 1, wherein the error signal compensates the interferometric measurement data set for any phenomenon that undermines an assumption that a single scattering location produces a pure frequency as a result of an OFDR swept-laser interferometry process.

12. The optical interrogation system in claim 11, wherein the phenomenon includes non-linearity in time in an OFDR laser frequency sweep and/or, chromatic dispersion.

13. The optical interrogation system of claim 1, wherein the data processing circuitry is configured to:
    select and isolate a region of the interferometric measurement data set in the delay domain centered at a reference reflector;
    transform the isolated data to the spectral domain;
    extract the phase argument from the spectral domain data to produce a measurement of the reference reflectors's response; and
    combine the reference reflectors known response with the measured response to produce a measured error signal.

14. The optical interrogation system of claim 1, wherein the data processing circuitry is configured to:
    measure an error signal using a reference reflector;
    select and isolate a portion of the interferometric measurement data set in the delay domain to be compensated by a determined error signal;
    transform the isolated portion of the interferometric measurement set from the delay domain to a spectral domain;
    apply the error signal to the transformed isolated data; and
    transform the compensated data to the delay domain to provide a compensated measurement data set for subsequent measurement of distributed sensor response.

15. The optical interrogation system of claim 1, wherein the data processing circuitry is configured to:
    measure an error signal for each of multiple reference reflectors along the length of the optical fiber;
    divide the interferometric measurement data set in the delay domain into a number of measurement data segments equal to the number of multiple reference reflectors;
    compensate each of the multiple measurement data segments by an error signal from a reference reflector located in proximity to each of the portions of measurement data; and produce a corrected interferometric measurement data set by combining the compensated measurement data segments.

16. The optical interrogation system of claim 1, wherein the data processing circuitry is configured to:
measure an error signal using a reference reflector;
determine a derivative of the error signal;
select a segment of the interferometric measurement data leading up to the location of the reference reflector;
perform an inverse Fourier transform on the portion of the interferometric measurement data;
resample the spectral domain response of the interferometric measurement data portion to have an optical frequency increment proportional to the derivative of the error signal for each of the data points in the interferometric measurement data portion; and
perform a Fourier Transform on the resampled spectral domain response to produce corrected interferometric measurement data that is corrected continuously over the interferometric measurement data portion.

17. An optical sensor comprising:
an optical fiber including multiple reference reflectors spaced along a length of the fiber, each of the multiple reference reflectors producing a reference scattering event having a known scattering profile including an elevated amplitude relative to scattering detected for neighboring segments of the optical fiber,
wherein each of the segments is a length of contiguous fiber that is useable to initialize and perform a distributed Optical Frequency Domain Reflectometry (OFDR) sensing operation.

18. The optical sensor in claim 17, wherein the optical sensor is a multi-point vibration sensor configured for vibration measurement and correction at each reference reflector.

19. The optical sensor in claim 17, wherein the reference reflectors are introduced in the optical fiber with a pulsed laser.

20. The optical sensor in claim 17, wherein the reference reflectors are included in a core of the optical fiber with minimal damage to the cladding and/or coating of the fiber.

21. The optical sensor in claim 17, wherein the reference reflectors are spliced into the optical fiber.

22. The optical sensor in claim 17, wherein each of the segments ranges in length from the order of several centimeters to tens or hundreds of meters.

23. The optical sensor in claim 17, wherein the segments do not include another reference reflector.

24. The optical sensor in claim 17, wherein the known scattering profile is associated with an interference in a spectral domain of a discrete frequency proportional to a distance to a location of the reference reflector along the length of the optical fiber.

25. The optical sensor in claim 17, wherein each reference reflector has a spectral domain response of substantially constant magnitude and substantially increasing and substantially known variation in phase over a range of optical frequencies swept by a tunable laser source.

26. A method in an Optical Frequency Domain Reflectometry (OFDR) interrogation system for measuring a parameter of an optical sensing light guide, comprising:
transmitting light via an optical interferometric interrogator to an optical sensing light guide manufactured to have one or more localized reference reflectors with at least one reference reflector being located in a segment of the optical sensing light guide between the ends of the optical sensing light guide;
each reference reflector producing a reference scattering event in response to the transmitted light and having a known scattering profile including elevated amplitude relative to scattering detected for neighboring segments of the optical sensing light guide, where each of the neighboring segments of the optical sensing light guide is a length of contiguous optical sensing light guide that is useable to initialize and perform a distributed OFDR sensing operation;
detecting optical interferometric measurement signals for a length of the optical sensing light guide; and
receiving interferometric measurement signals from the optical detection circuitry,
generating an interferometric measurement data set for the length of the optical sensing light guide;
isolating the interferometric measurement data set in proximity of each of the one or more reference reflectors including the at least one reference reflector;
determining a error signal from the isolated data set for each of the reference reflectors; and
providing the error signal for correction of the interferometric measurement data set and/or reporting of the error signal.

27. The method in claim 26, wherein the error signal is determined without requiring baseline OFDR measurement data for the optical sensing light guide.

28. The method in claim 26, further comprising correcting the interferometric measurement data set locally for, at, or near each reference reflector with little or no a-priori knowledge of the state of the optical sensing light guide up to that point in the fiber.

29. The method in claim 26, further comprising using the error signal to compensate the interferometric measurement data set for any phenomenon that undermines an assumption that a single scattering location produces a pure frequency as a result of an OFDR swept-laser interferometry process.

30. The method in claim 26, further comprising:
selecting and isolating a region of the interferometric measurement data set in the delay domain centered at a reference reflector;
transforming the isolated data to the spectral domain;
extracting the phase argument from the spectral domain data to produce a measurement of the reference reflector's response; and
combining the reference reflector's known response with the measured response to produce a measured error signal.

31. The method in claim 26, further comprising:
measuring an error signal using a reference reflector;
selecting and isolating a portion of the interferometric measurement data set in a delay domain to be compensated by a determined error signal;
transforming the isolated portion of the interferometric measurement set from the delay domain to a spectral domain;
applying the error signal to the transformed isolated data; and
transforming the compensated data to the delay domain to provide a compensated measurement data set for subsequent measurement of distributed sensor response.

32. The method in claim 26, further comprising:
measuring a error signal for each of multiple reference reflectors along the length of the optical fiber;
dividing the interferometric measurement data set in the delay domain into a number of measurement data segments equal to the number of multiple reference reflectors;

compensating each of the multiple measurement data segments by a error signal from a reference reflector located in proximity to each of the portions of measurement data;

producing a corrected interferometric measurement data set by combining the compensated measurement data segments.

33. The method in claim 26, further comprising:

measuring a error signal using a reference reflector;

determining a derivative of the error signal;

selecting a segment of the interferometric measurement data leading up to the location of the reference reflector;

performing an inverse Fourier transform on the portion of the interferometric measurement data;

resampling the spectral domain response of the interferometric measurement data portion to have an optical frequency increment proportional to the derivative of the error signal for each of the data points in the interferometric measurement data portion;

performing a Fourier Transform on the resampled spectral domain response to produce corrected interferometric measurement data that is corrected continuously over the interferometric measurement data portion.

* * * * *